US012674698B2

(12) United States Patent
Sasahara et al.

(10) Patent No.: US 12,674,698 B2
(45) Date of Patent: Jul. 7, 2026

(54) INFORMATION PROCESSING DEVICE AND NON-TRANSITORY COMPUTER-READABLE STORAGE MEDIUM STORING PROGRAM

(71) Applicant: SEIKO EPSON CORPORATION, Tokyo (JP)

(72) Inventors: Hideo Sasahara, Suwa (JP); Yoshihiro Yamamura, Azumino (JP); Hidetoshi Yamamoto, Suwa (JP); Yuya Ozawa, Suzaka (JP)

(73) Assignee: SEIKO EPSON CORPORATION, Tokyo (JP)

( * ) Notice: Subject to any disclaimer, the term of this patent is extended or adjusted under 35 U.S.C. 154(b) by 306 days.

(21) Appl. No.: 18/384,985

(22) Filed: Oct. 30, 2023

(65) Prior Publication Data

US 2024/0142292 A1     May 2, 2024

(30) Foreign Application Priority Data

Oct. 31, 2022     (JP) ................................. 2022-174581

(51) Int. Cl.
| | |
|---|---|
| *G01F 23/284* | (2006.01) |
| *G01F 23/00* | (2022.01) |
| *G01F 23/80* | (2022.01) |

(52) U.S. Cl.
CPC ...... *G01F 23/2845* (2013.01); *G01F 23/0023* (2013.01); *G01F 23/804* (2022.01)

(58) Field of Classification Search
None
See application file for complete search history.

(56) References Cited

U.S. PATENT DOCUMENTS 10,895,146 B1 *   1/2021   Rashed ................... E21B 47/01

FOREIGN PATENT DOCUMENTS

| | | | |
|---|---|---|---|
| CN | 202648743 U | * | 1/2013 |
| JP | 2014-119266 A | | 6/2014 |

* cited by examiner

*Primary Examiner* — Vladimir Magloire
*Assistant Examiner* — Ashley Brown Raynal
(74) *Attorney, Agent, or Firm* — Oliff PLC

(57) ABSTRACT

An information processing device includes an acquisition device that acquires, as a first strength, a strength of a radio signal related to position information received at a position of a first height, and a first determination device that determines that the first height is a water level when an attenuation amount of the first strength with respect to a reference strength exceeds a predetermined value.

16 Claims, 18 Drawing Sheets

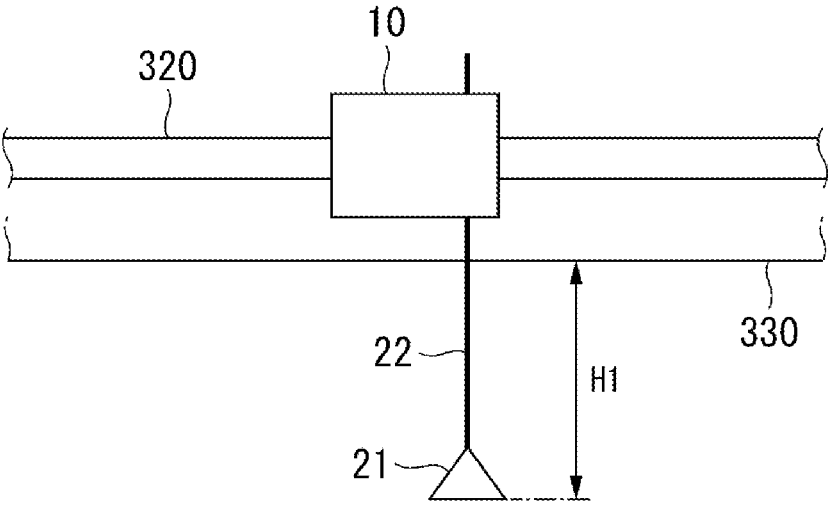
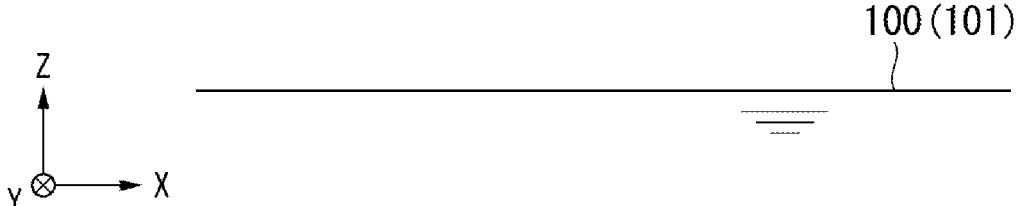
FIG. 5
| ANTENNA DEPTH FROM WATER SURFACE (cm) | AVERAGE ATTENUATION AMOUNT OF SIGNAL STRENGTH (dB) |
|---|---|
| 0 | −6 |
| 5 | −18 |
FIG. 6

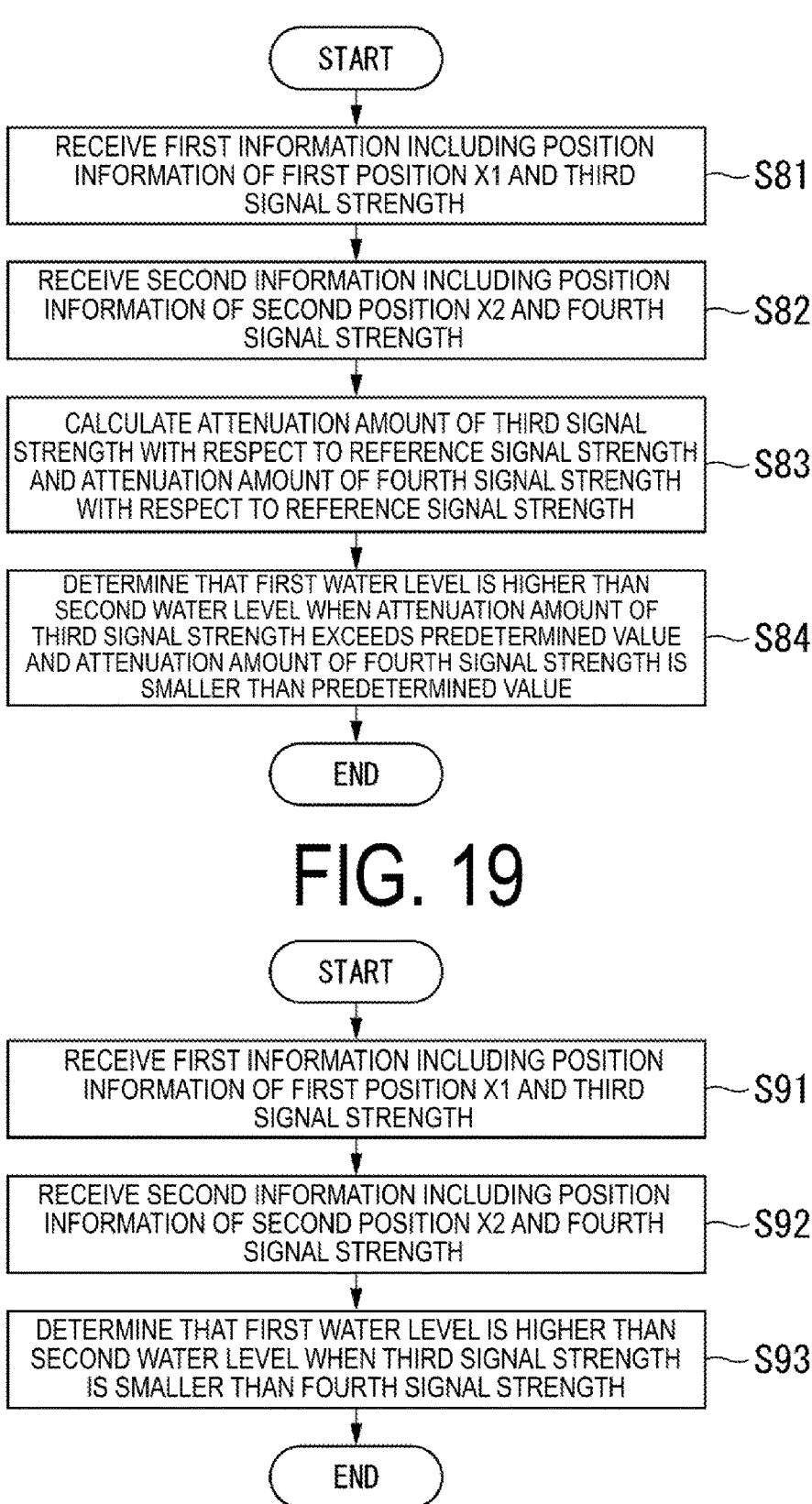

START

RECEIVE FIRST INFORMATION INCLUDING POSITION INFORMATION OF FIRST POSITION X1 AND THIRD SIGNAL STRENGTH — S81

RECEIVE SECOND INFORMATION INCLUDING POSITION INFORMATION OF SECOND POSITION X2 AND FOURTH SIGNAL STRENGTH — S82

CALCULATE ATTENUATION AMOUNT OF THIRD SIGNAL STRENGTH WITH RESPECT TO REFERENCE SIGNAL STRENGTH AND ATTENUATION AMOUNT OF FOURTH SIGNAL STRENGTH WITH RESPECT TO REFERENCE SIGNAL STRENGTH — S83

DETERMINE THAT FIRST WATER LEVEL IS HIGHER THAN SECOND WATER LEVEL WHEN ATTENUATION AMOUNT OF THIRD SIGNAL STRENGTH EXCEEDS PREDETERMINED VALUE AND ATTENUATION AMOUNT OF FOURTH SIGNAL STRENGTH IS SMALLER THAN PREDETERMINED VALUE — S84

END

FIG. 19

START

RECEIVE FIRST INFORMATION INCLUDING POSITION INFORMATION OF FIRST POSITION X1 AND THIRD SIGNAL STRENGTH — S91

RECEIVE SECOND INFORMATION INCLUDING POSITION INFORMATION OF SECOND POSITION X2 AND FOURTH SIGNAL STRENGTH — S92

DETERMINE THAT FIRST WATER LEVEL IS HIGHER THAN SECOND WATER LEVEL WHEN THIRD SIGNAL STRENGTH IS SMALLER THAN FOURTH SIGNAL STRENGTH — S93

END

INFORMATION PROCESSING DEVICE AND NON-TRANSITORY COMPUTER-READABLE STORAGE MEDIUM STORING PROGRAM

The present application is based on, and claims priority from JP Application Serial Number 2022-174581, filed Oct. 31, 2022, the disclosure of which is hereby incorporated by reference herein in its entirety.

BACKGROUND

1. Technical Field

The present disclosure relates to an information processing device and a non-transitory computer-readable storage medium storing a program.

2. Related Art

For example, JP-A-2014-119266 discloses a water management system including an information collection device that collects Global Positioning System (GPS) information while moving in a floating state on a water surface of a river or the like, and a central processing device that calculates a water level based on height information included in the GPS information collected by the information collection device.

As described above, in the technique disclosed in JP-A-2014-119266, the water level is calculated based on the height information included in the GPS information, that is, the height of the information collection device floating on the water surface. However, although GPS satellites are evenly disposed in the horizontal direction, GPS satellites below the horizon are not visible, and thus the GPS satellites are not evenly disposed in the vertical direction. For that reason, in the GPS, position measuring accuracy in the vertical direction is generally lower than position measuring accuracy in the horizontal direction. Accordingly, it is difficult to accurately measure the water level with the technique disclosed in JP-A-2014-119266.

SUMMARY

An information processing device according to an aspect of the present disclosure includes: an acquisition device configured to acquire, as a first strength, a strength of a radio signal related to position information received at a position of a first height; and a first determination device configured to determine that the first height is a water level when an attenuation amount of the first strength with respect to a reference strength exceeds a predetermined value.

An information processing device according to an aspect of the present disclosure includes: a communication device configured to receive information including a first height and a first strength indicating a strength of a radio signal related to position information received at a position of the first height; and a second determination device configured to determine that the first height is a water level when an attenuation amount of the first strength with respect to a reference strength exceeds a predetermined value.

A non-transitory computer-readable storage medium storing a program, the program according to an aspect of the present disclosure being configured to cause a computer to execute: acquiring, as a first strength, a strength of a radio signal related to position information received at a position of a first height; and determining that the first height is a water level when an attenuation amount of the first strength with respect to a reference strength exceeds a predetermined value.

A non-transitory computer-readable storage medium storing a program, the program according to an aspect of the present disclosure being configured to cause a computer to execute: receiving information including a first height and a first strength indicating a strength of a radio signal related to position information received at a position of the first height; and determining that the first height is a water level when an attenuation amount of the first strength with respect to a reference strength exceeds a predetermined value.

BRIEF DESCRIPTION OF THE DRAWINGS

FIG. 5 is a diagram showing a state in which a signal reception height is adjusted to a first height.

FIG. 6 is a diagram showing a relationship between an antenna depth from a water surface and an average attenuation amount of a signal strength.

FIG. 19 is a flowchart showing sixth water level determination processing executed by a second control device of a management device according to a seventh embodiment.

FIG. 20 is a flowchart showing seventh water level determination processing executed by a second control device of a management device according to an eighth embodiment.

DESCRIPTION OF EMBODIMENTS

Embodiments of the present disclosure will be described below with reference to the drawings. In each of the following drawings, in order to show each member with recognizable sizes, scales of each member may be different from actual ones. In addition, in each of the following drawings, if necessary, XYZ axes are used as coordinate axes orthogonal to each other, and in each of the drawings, directions indicated by each arrow along the axes are referred to as + directions, and directions opposite to the + directions are referred to as − directions.

In addition, in the following description, a +X direction may be referred to as rightward or a right side, and a −X direction may be referred to as leftward or a left side. Also, a +Y direction may be referred to as upstream or an upstream, and a −Y direction may be referred to as downstream or a downstream. Further, a +Z direction may be referred to as upward or an upward side, and a −Z direction may be referred to as downward or a downward side, and viewing in the +Z direction is referred to as a plan view or planar viewing.

First Embodiment

Figure 1:
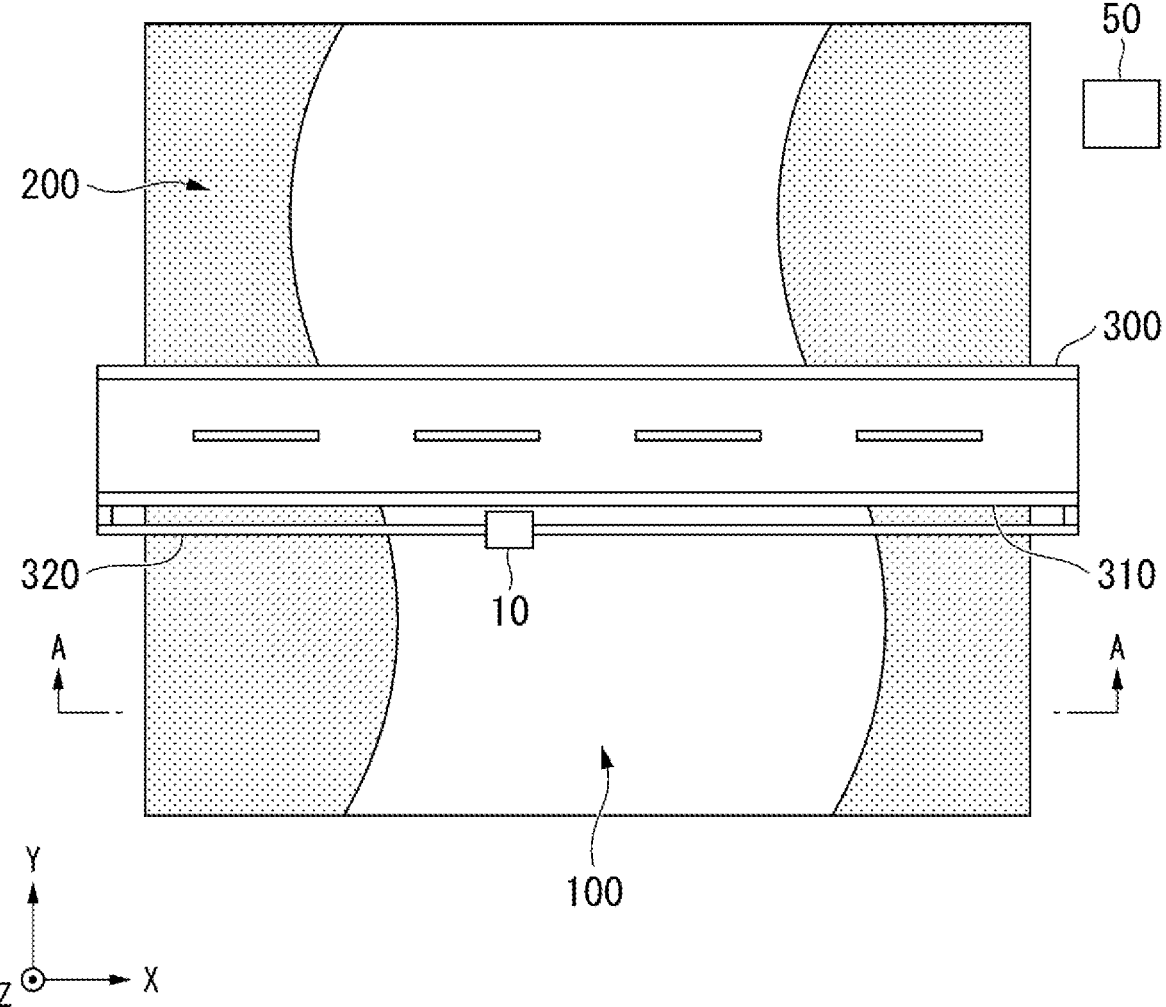
FIG. 1 is a plan view schematically showing a schematic configuration of an information management system.

First, a first embodiment will be described. FIG. 1 is a plan view schematically showing a schematic configuration of an information management system according to this embodiment. As an example, the information management system according to this embodiment manages a water level of a river 100. The river 100 flows along a waterway provided in a river structure 200. Also, a water area managed by the information management system is not limited to the river 100, and may be, for example, a lake, a marsh, a pond, or a coast.

The information management system includes a measurement device 10 and a management device 50. The measurement device 10 measures the water level of the river 100. The measurement device 10 corresponds to an information processing device. The measurement device 10 is attached to a bridge 300 that extends along the X axis and is installed across the river 100. Specifically, for example, a guide rail 320 extending along the X axis is installed on a side surface 310 facing a downstream of the river 100 among side surfaces of the bridge 300. The measurement device 10 is attached to the guide rail 320 and moves along the guide rail 320. That is, the measurement device 10 is installed on the bridge 300 to be movable along the X axis.

Although details will be described later, the measurement device 10 receives radio signals related to position information transmitted from GPS satellites and measures the water level of the river 100 based on strengths of the received radio signals. Also, in this embodiment, as an example, a form in which the measurement device 10 receives radio signals transmitted from GPS satellites will be described, but a satellite-based position measurement system is not limited to GPS, and, for example, other satellite systems such as the Russian satellite system GRONASS (Global Orbiting Navigation Satellite System), the Chinese satellite system BeiDou (BeiDou Navigation Satellite System), and the European satellite system Galileo may be used.

The measurement device 10 transmits water level information including measurement results of the water level to the management device 50. The management device 50 manages the water level information received from the measurement device 10. In addition, when the management device 50 determines that the water level of the river 100 has reached a dangerous water level based on the water level information, the management device 50 outputs an alarm. Further, the measurement device 10 may also be installed not only on the bridge 300 but also on another bridge of the river 100, or may also be installed on a bridge of a river other than the river 100. In this case, the management device 50 centrally manages water level information obtained from all the measurement devices 10 within its assigned area.

For example, the measurement device 10 and the management device 50 communicate with each other wirelessly. A wireless communication method used between the measurement device 10 and the management device 50 is not particularly limited. For example, when the management device 50 is installed at a position relatively far from the bridge 300 on which the measurement device 10 is installed, a wireless communication method such as a mobile communication method such as low power wide area (LPWA) may be adopted. Also, for example, when the management device 50 is installed at a position relatively close to the bridge 300 on which the measurement device 10 is installed, a wireless communication method for short-range communication such as Bluetooth (registered trademark) may be adopted.

Figure 2:
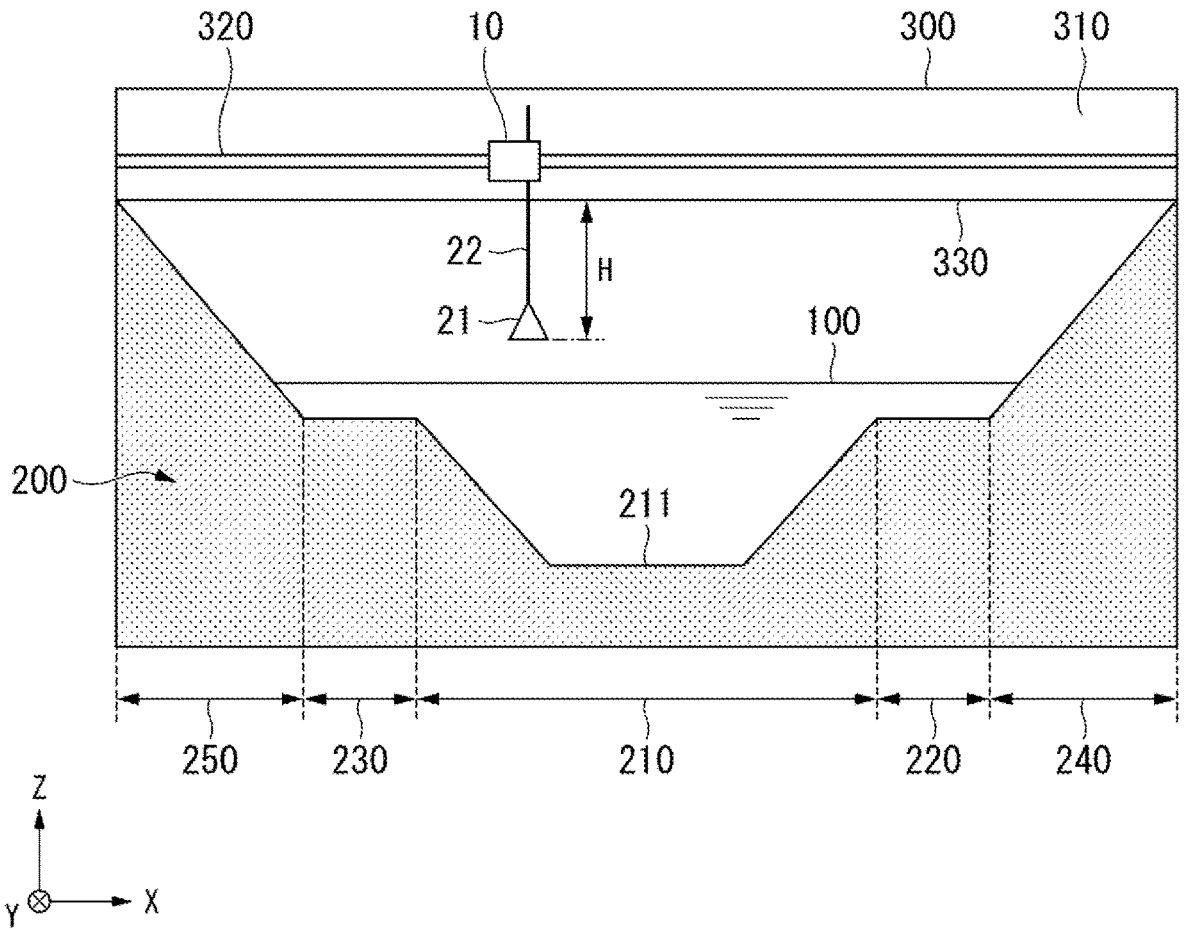
FIG. 2 is a cross-sectional view taken along line A-A shown in FIG. 1 showing a positional relationship between a measurement device and a river structure.

FIG. 2 is a cross-sectional view taken along line A-A shown in FIG. 1 showing a positional relationship between the measurement device 10 and the river structure 200. As an example, the river structure 200 includes a low waterway 210, a right bank terrace land 220, a left bank terrace land 230, a right bank levee 240, and a left bank levee 250. The low waterway 210 is a waterway through which water of the river 100 normally flows. The right bank terrace land 220 and the left bank terrace land 230 are sites one step higher than the low waterway 210 and are normally used in various forms such as a baseball field or a park, but as shown in FIG. 2, they are portions that are submerged in water when the river 100 rises. The right bank levee 240 and the left bank levee 250 are sloping grounds for protecting a protected lowland from flooding of the river 100.

The measurement device 10 includes one antenna 21 attached to a lower end of a support rod 22 which is a rod-like member extending along the Z axis. The antenna 21 receives a radio signal transmitted from a GPS satellite. The support rod 22 moves along the Z axis, that is, in the vertical direction. In FIG. 2, the support rod 22 is shown to pass through a housing of the measurement device 10, but the support rod 22 may be attached to an outer surface of the housing of the measurement device 10. As the support rod 22 moves in the vertical direction, the antenna 21 also moves in the vertical direction.

As shown in FIG. 2, in this embodiment, a distance on the Z axis from a bottom surface 330 of the bridge 300 on which the measurement device 10 is installed to a tip of the antenna 21 is defined as a "signal reception height H". The signal reception height H is a height of a position at which the antenna 21 receives a radio signal. Accordingly, the definition of the signal reception height H is not limited to the above definition as long as the height of the position at which the antenna 21 receives the radio signal can be represented by the signal reception height H. For example, a distance on the Z axis from a bottom surface 211 of the low waterway 210, that is, a river bottom of the river 100, to the tip of the antenna 21 may be defined as the signal reception height H. When the antenna 21 moves in the vertical direction, a value of the signal reception height H changes.

Figure 3:
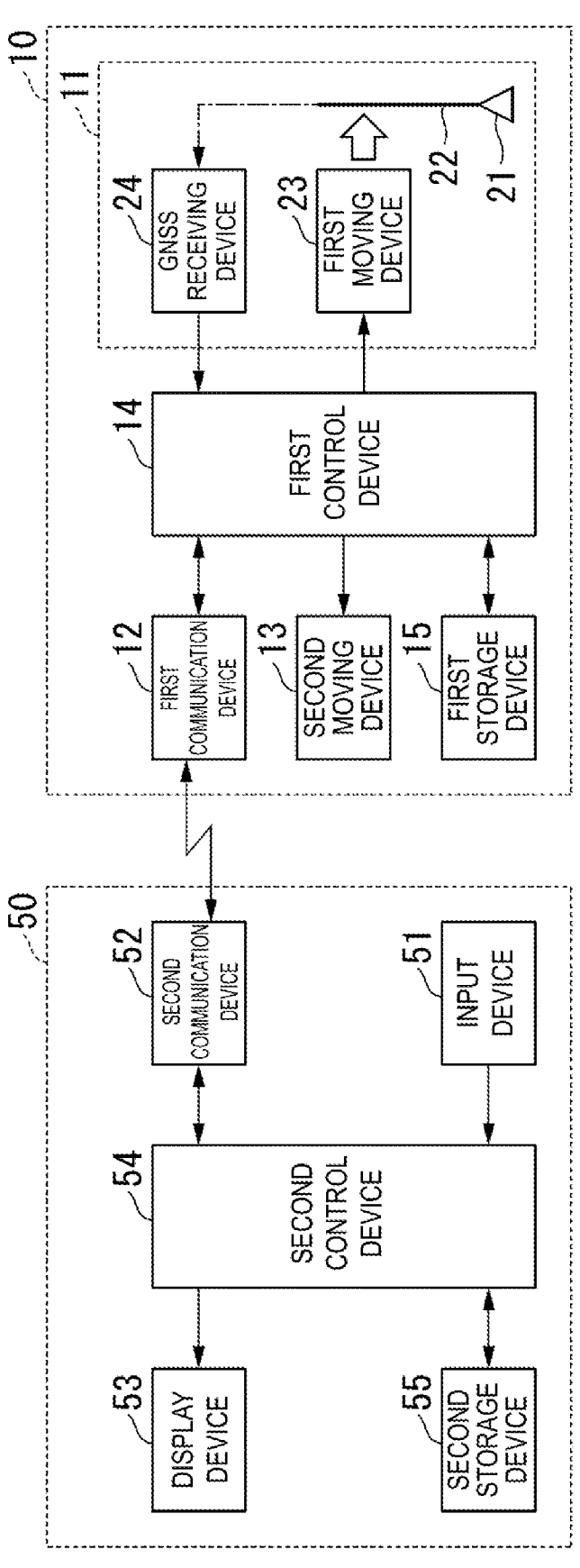
FIG. 3 is a block diagram schematically showing schematic configurations of a measurement device and a management device according to a first embodiment.

FIG. 3 is a block diagram schematically showing schematic configurations of the measurement device 10 and the management device 50. As shown in FIG. 3, the measurement device 10 includes an acquisition device 11, a first communication device 12, a second moving device 13, a first control device 14, and a first storage device 15. The management device 50 includes an input device 51, a second communication device 52, a display device 53, a second control device 54, and a second storage device 55. For example, the management device 50 is a personal computer, a smartphone, a tablet terminal, or the like.

First, each device included in the measurement device 10 will be described below.

The acquisition device 11 acquires a strength of a radio signal related to position information received at a predetermined signal reception height H, and acquires the position information based on the received radio signal. For example, the acquisition device 11 acquires a signal to noise ratio (SNR) as the strength of the radio signal. The position information includes at least latitude and longitude. The acquisition device 11 includes a first moving device 23 and a GPS receiving device 24 in addition to the antenna 21 and the support rod 22.

The first moving device 23 moves the support rod 22 in the vertical direction in accordance with a height command signal input from the first control device 14. That is, the first moving device 23 indirectly moves the antenna 21 in the vertical direction via the support rod 22. For example, the first moving device 23 is a uniaxial actuator including a motor and a conversion mechanism that converts a rotational motion of the motor into a linear motion of the support rod 22.

The height command signal output from the first control device 14 to the first moving device 23 instructs a target height of the signal reception height H. The first moving device 23 moves the support rod 22 in the vertical direction so that the signal reception height H becomes the target height instructed by the height command signal. In this way, the first moving device 23 is controlled by the first control device 14, whereby the position of the antenna 21 on the Z axis, that is, the signal reception height H, is adjusted.

As described above, the antenna 21 receives the radio signal transmitted from the GPS satellite at the position of the signal reception height H. For example, the antenna 21 converts the radio signal received at the position of the signal reception height H into a current signal and outputs the current signal to the GPS receiving device 24. The GPS receiving device 24 calculates the position information based on the current signal input from the antenna 21, and calculates the strength of the radio signal received by the antenna 21 at the signal reception height H. For example, the GPS receiving device 24 calculates the SNR as the strength of the radio signal.

The function of calculating the position information and the SNR as described above is generally well known as a function of the GPS receiving device 24, and thus in this embodiment, detailed description of these functions will be omitted. In brief, the GPS receiving device 24 calculates position information such as longitude and latitude based on radio signals received from at least four GPS satellites.

The radio signal transmitted from a GPS satellite includes a pseudo-random code indicating an identification number of the GPS satellite and a navigation message including orbit information or the like of the GPS satellite. The GPS receiving device 24 generates the same replica code as the pseudo random code unique to the GPS satellite in synchronization with the GPS satellite, and calculates a distance to the GPS satellite based on a phase difference between the pseudo random code and the replica code included in the radio signal received from the GPS satellite. The GPS receiving device 24 calculates such a distance for each of at least four GPS satellites, and calculates the position information based on the calculated distance and orbit information of each GPS satellite.

Further, the GPS receiving device 24 calculates the SNR of the radio signal received from each of the at least four GPS satellites used to calculate the position information. In the following description, a GPS satellite used to calculate the position information, that is, a GPS satellite captured by the GPS receiving device 24, may be referred to as a "captured satellite".

The GPS receiving device 24 calculates the position information and the SNR as described above at predetermined time intervals, and outputs the acquired information to the first control device 14. The acquired information includes at least the position information and signal strength information. For example, the signal strength information includes a value of the SNR obtained for each captured satellite.

The first communication device 12 performs wireless communication with the second communication device 52 of the management device 50. The first communication device 12 transmits a wireless signal including information input from the first control device 14 to the second communication device 52. The first communication device 12 outputs information included in the wireless signal received from the second communication device 52 to the first control device 14.

For example, when a short-range communication method is adopted as the wireless communication method between the measurement device 10 and the management device 50, as shown in FIG. 3, the wireless signal transmitted from the first communication device 12 is directly transmitted to the second communication device 52. For example, when a mobile communication method is adopted as the wireless communication method between the measurement device 10 and the management device 50, information included in the wireless signal transmitted from the first communication device 12 is finally transmitted to the second communication device 52 via a mobile communication network.

The second moving device 13 moves the measurement device 10 along the guide rail 320 in accordance with a position command signal input from the first control device 14. That is, the second moving device 13 moves the acquisition device 11 along the X axis together with the measurement device 10. Since the acquisition device 11 includes the antenna 21, the second moving device 13 can be said to be a device that moves the antenna 21 along the X axis. For example, the second moving device 13 is a traveling device including a motor and a plurality of wheels driven by the motor.

The position command signal output from the first control device 14 to the second moving device 13 instructs a target position on the X axis, that is, in the horizontal direction. The second moving device 13 moves the measurement device 10 so that a position of the antenna 21 in the horizontal direction becomes the target position indicated by the position command signal. In this way, the second moving device 13 is controlled by the first control device 14, whereby the position of the antenna 21 in the horizontal direction is adjusted.

The first control device 14 is a processor that controls overall operations of the measurement device 10 in accordance with a program stored in advance in the first storage device 15. For example, the first control device 14 is configured of one or more central processing units (CPUs). Some or all of functions of the first control device 14 may be configured by a circuit such as a digital signal processor (DSP), an application specific integrated circuit (ASIC), a programmable logic device (PLD), or a field programmable gate array (FPGA). The first control device 14 performs various types of processing in parallel or sequentially.

Although details will be described later, the first control device 14 adjusts the position of the antenna 21 on the Z axis, that is, the signal reception height H, by outputting the height command signal to the first moving device 23. In addition, the first control device 14 adjusts the position of the antenna 21 in the horizontal direction by outputting the position command signal to the second moving device 13. Further, the first control device 14 determines the water level of the river 100 based on the signal strength information included in the acquired information obtained from the GPS receiving device 24 at predetermined time intervals. The first control device 14 corresponds to a first determination device.

The first control device 14 transmits water level information including the measurement results of the water level to the management device 50 via the first communication device 12. The water level information includes at least a water level determination result based on the signal strength information and the position information included in the acquired information together with the signal strength information.

The first storage device 15 includes a nonvolatile memory that stores programs, various setting data, and the like required for causing the first control device 14 to execute various processing, and a volatile memory that is used as a temporary storage destination of data when the first control device 14 executes various processing. The nonvolatile memory is, for example an electrically erasable programmable read-only memory (EEPROM), a read only memory (ROM), a flash memory, or the like. The volatile memory is, for example, a random access memory (RAM).

Next, each device included in the management device 50 will be described.

The input device 51 is a device that receives an input operation of an operator to the management device 50. For example, when the management device 50 is a personal computer, the input device 51 includes a keyboard, a mouse, and the like. Also, for example, when the management device 50 is a tablet terminal, the input device 51 is a touch panel. The input device 51 outputs an electric signal generated by being operated by the operator to the second control device 54 as an operation signal.

The second communication device 52 performs wireless communication with the first communication device 12 of the measurement device 10. The second communication device 52 transmits a wireless signal including information input from the second control device 54 to the first communication device 12. The second communication device 52 outputs water level information included in the wireless signal received from the first communication device 12 to the second control device 54.

The display device 53 displays an image by being controlled by the second control device 54. The display device 53 is, for example, a liquid crystal panel, an organic electro luminescence (EL) panel, or the like. For example, when the management device 50 is a tablet terminal, the display device 53 may be a touch panel configured integrally with the input device 51.

The second control device 54 is a processor that controls overall operations of the management device 50 in accordance with a program stored in advance in the second storage device 55. For example, the second control device 54 is configured by one or a plurality of CPUs. Some or all of functions of the second control device 54 may be configured by a circuit such as a DSP, an ASIC, a PLD, or an FPGA. The second control device 54 performs various types of processing in parallel or sequentially.

The second storage device 55 includes a nonvolatile memory that stores programs, various setting data, and the like required for causing the second control device 54 to execute various processing, and a volatile memory that is used as a temporary storage destination of data when the second control device 54 executes various processing. For example, when the management device 50 is a personal computer, the second storage device 55 may include a large-capacity hard disk drive.

The second control device 54 controls overall operations of the management device 50 based on operation signals input from the input device 51. For example, the second control device 54 manages the water level information received from the measurement device 10 via the second communication device 52. Specifically, the second control device 54 stores information indicating a correspondence relationship among the received water level information, a reception time of the water level information, and identification information of the measurement device 10 in a storage region used as database of the water level information in storage regions of the second storage device 55.

When the second control device 54 determines that the water level of the river 100 has reached the dangerous water level based on the water level determination result included in the received water level information, the second control device 54 may output an alarm to the operator. For example, the second control device 54 causes the display device 53 to display a warning image for notifying the operator that the water level of the river 100 has reached the dangerous water level. When the management device 50 includes a speaker, the second control device 54 may output an alarm sound from the speaker.

Next, operations of the information management system configured as described above will be described.

Figure 4:
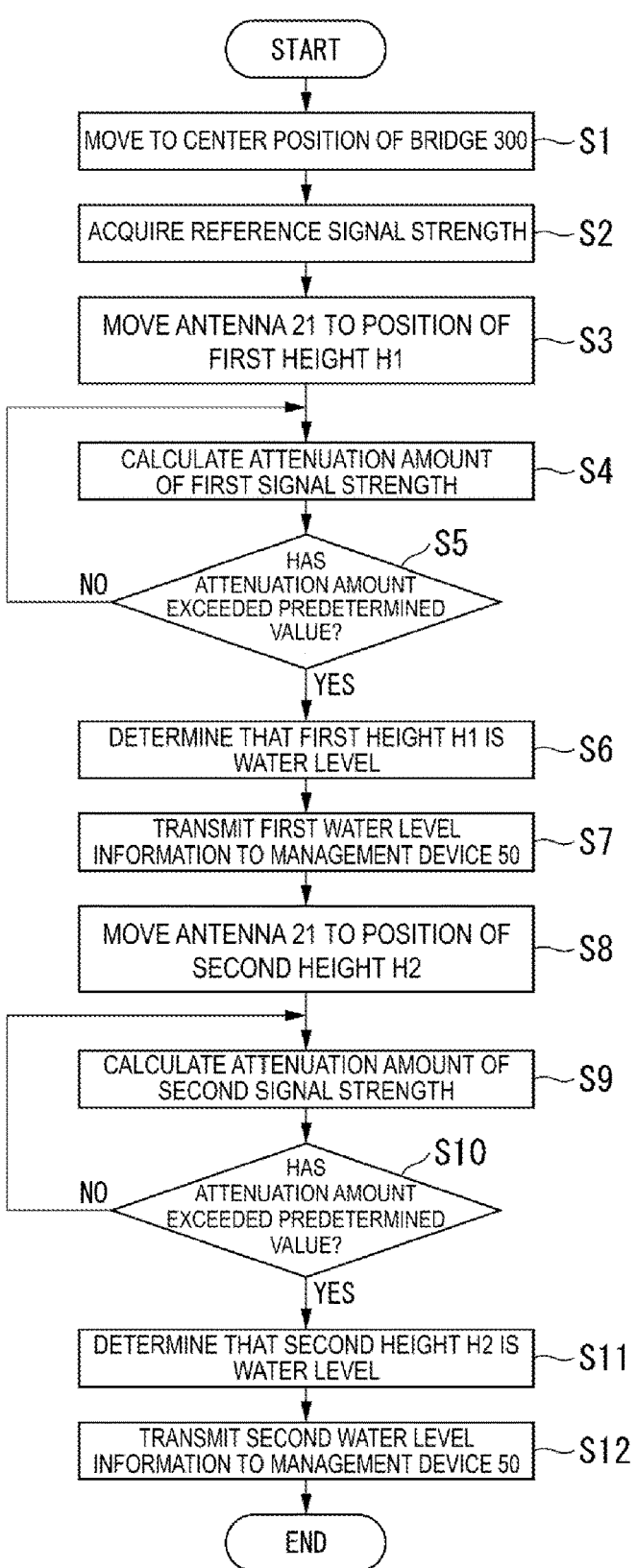
FIG. 4 is a flowchart showing first water level determination processing executed by a first control device of the measurement device according to the first embodiment.

FIG. 4 is a flowchart showing first water level determination processing executed by the first control device 14 of the measurement device 10. When the first control device 14 receives a water level measurement command from the management device 50 via the first communication device 12, the first control device 14 reads and executes a program from the first storage device 15, thereby executing the first water level determination processing shown in FIG. 4.

For example, when the river 100 is expected to rise due to an approaching typhoon or the like, the operator can instruct the management device 50 to start water level measurement by the measurement device 10 by operating the input device 51 of the management device 50. When the second control device 54 of the management device 50 determines that an operation for starting the water level measurement is received based on an operation signal input from the input device 51, the second control device 54 of the management device 50 transmits a water level measurement command to the measurement device 10 via the second communication device 52.

As shown in FIG. 4, when the first water level determination processing is started, the first control device 14 first outputs the position command signal indicating a center position of the bridge 300 as the target position in the horizontal direction to the second moving device 13, thereby moving the measurement device 10 so that the position of the antenna 21 in the horizontal direction becomes the center position of the bridge 300 (step S1). Also, the target position in the horizontal direction is not limited to the center position of the bridge 300, and may be any position as long as it is suitable for measuring the water level due to rising water. Further, the target position in the horizontal direction may be a preset position or may be a position instructed by the management device 50.

In step S1, the first control device 14 may detect a current position of the measurement device 10 based on a moving distance of the measurement device 10 from a known start position, and stop the measurement device 10 when the current position reaches the target position. Alternatively, the first control device 14 may move the measurement device 10 while acquiring the position information from the GPS receiving device 24, and stop the measurement device 10 when it is detected that the measurement device 10 has reached the target position based on the position information.

After the measurement device 10 has moved to the center position of the bridge 300, the first control device 14 activates the GPS receiving device 24 to acquire a reference signal strength for each captured satellite (step S2). For example, in a period in which there is no need to perform the water level measurement, it is preferable to turn off a power supply of the measurement device 10 in order to reduce power consumption of the measurement device 10. When the measurement device 10 is in a power-off state, the GPS receiving device 24 is also in a power-off state. In this way, when the GPS receiving device 24 is in the power-off state at the start of the first water level determination processing, the first control device 14 first needs to activate the GPS receiving device 24.

After activation, the GPS receiving device 24 searches for capture candidate satellites that can be captured among all GPS satellites based on a current time, satellite information such as almanac data stored in a memory built in the GPS receiving device 24, position information obtained last before the power-off, and the like. When at least four capture candidate satellites are found, the GPS receiving device 24 attempts to capture radio signals transmitted from these capture candidate satellites. Although detailed description will be omitted, the determination of whether or not a radio signal from a capture candidate satellite has been captured is performed based on a correlation value between the pseudo random code included in the radio signal received by the antenna 21 and the replica code generated by the GPS receiving device 24.

When the GPS receiving device 24 succeeds in capturing the radio signal from the capture candidate satellite, the GPS receiving device 24 locks on the successfully captured radio signal as a target radio signal. At the time when the radio signal from the capture candidate satellite has been captured, the SNR of the captured radio signal, that is, the target radio signal, is calculated. When the GPS receiving device 24 succeeds in capturing the radio signals from at least four capture candidate satellites, the GPS receiving device 24 calculates the position information based on the pseudo random codes and the navigation messages included in the locked on radio signals among the radio signals received by the antenna 21, that is, the target radio signals.

The GPS receiving device 24 calculates the position information and the SNR as described above at predetermined time intervals, and outputs the acquired information to the first control device 14. As already described, the acquired information includes at least the position information and the signal strength information, and the signal strength information includes the value of the SNR obtained for each captured satellite. The captured satellite is a GPS satellite captured by the GPS receiving device 24, that is, a GPS satellite that transmits a target radio signal among the capture candidate satellites.

For example, after the activation of the GPS receiving device 24, the first control device 14 first acquires the value of the SNR for each captured satellite included in the signal strength information obtained from the GPS receiving device 24 as the reference signal strength for each captured satellite. After acquiring the reference signal strength for each captured satellite, the first control device 14 stores the reference signal strength in the first storage device 15 in association with an identification number of the captured satellite. When the GPS receiving device 24 is in a power-on state at the start of the first water level determination processing, the latest reference signal strength is already stored in the first storage device 15. Accordingly, in this case, the first control device 14 may skip the processing of step S2.

Also, step S2 of acquiring the reference signal strength is executed while the signal reception height H is adjusted to a predetermined reference height. That is, the first control device 14 acquires the value of the SNR of each target radio signal received by the antenna 21 at a position of a reference height as the reference signal strength for each captured satellite. The position of the reference height may be a position where the antenna 21 is far away from a water surface of the river 100. For example, the reference height is a minimum value of the signal reception height H that is mechanically adjustable by the first moving device 23.

Subsequently, the first control device 14 outputs the height command signal indicating a first height H1 as the target height of the signal reception height H to the first moving device 23, thereby moving the antenna 21 in the vertical direction so that the signal reception height H becomes the first height H1 (step S3). FIG. 5 is a diagram showing a state in which the signal reception height H is adjusted to the first height H1. In FIG. 5, the water surface 101 of the river 100 is a water surface at the time when the signal reception height H is adjusted to the first height H1. At this time, the water surface 101 of the river 100 has not yet reached the antenna 21.

As described above, after the signal reception height H is adjusted to the first height H1, the GPS receiving device 24 calculates the position information based on each target radio signal received by the antenna 21 at the position of the first height H1, and calculates the SNR of each target radio signal received at the position of the first height H1. The GPS receiving device 24 calculates the position information and the SNR as described above at predetermined time intervals, and outputs the acquired information including the position information and the signal strength information to the first control device 14. Each time the acquired information is input from the GPS receiving device 24, the first control device 14 executes the processing of steps S4 and S5 described later. In addition, in the first embodiment, it is not always necessary for the GPS receiving device 24 to calculate the position information.

When the acquired information is input from the GPS receiving device 24, the first control device 14 acquires the value of the SNR included in the signal strength information of the input acquired information as a first signal strength for each captured satellite, and calculates an attenuation amount of the first signal strength with respect to the reference signal strength for each captured satellite (step S4). For example, the first control device 14 calculates a difference between the reference signal strength and the first signal strength as the attenuation amount of the first signal strength with respect to the reference signal strength.

Then, the first control device 14 determines whether or not an average value of the attenuation amount of the first signal strength obtained for each captured satellite, that is, an average attenuation amount of the first signal strength, exceeds a predetermined value (step S5). As an example, the predetermined value is −6 (dB). When the average attenuation amount of the first signal strength does not exceed the predetermined value (step S5: No), the first control device 14 returns to the processing of step S4, and when the next acquired information is input from the GPS receiving device 24, the first control device 14 executes the processing of step S4 again. On the other hand, when the average attenuation amount of the first signal strength exceeds the predetermined value (step S5: Yes), the first control device 14 determines that the first height H1 is the water level (step S6).

The reason why the predetermined value is set to −6 (dB) is as follows.

Figure 7:
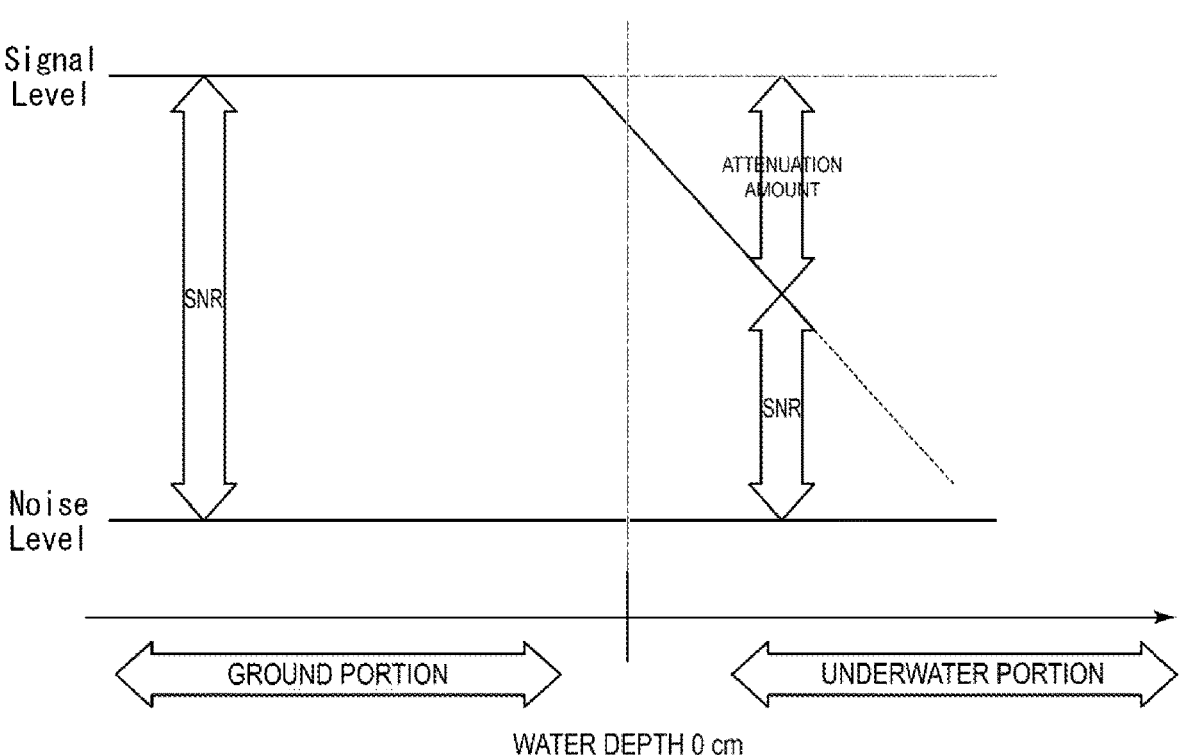
FIG. 7 is a diagram schematically showing a state in which the signal strength attenuates with an increase in antenna depth.

FIG. 6 is a diagram showing a relationship between an antenna depth from the water surface and the average attenuation amount of the signal strength. FIG. 6 shows results obtained by acquiring SNRs of radio signals received from a plurality of GPS satellites as signal strengths at positions where the antenna depth from the water surface is 0 (cm) and 5 (cm) and calculating an average value of attenuation amounts of the signal strengths with respect to the reference signal strength obtained for each GPS satellite. The reference signal strength is an SNR of a radio signal received from each GPS satellite at a height position separated from the water surface. FIG. 7 is a diagram schematically showing a state in which the signal strength attenuates as the antenna depth (water depth) from the water surface increases.

As can be seen from FIGS. 6 and 7, the average attenuation amount of the signal strength with respect to the reference signal strength increases as the antenna depth from the water surface increases. For example, when the antenna depth from the water surface is 0 (cm), the average attenuation amount of the signal strength with respect to the reference signal strength is −6 (dB). Accordingly, for example, when the average attenuation amount of the first signal strength with respect to the reference signal strength exceeds −6 (dB) while the signal reception height H is set to the first height H1, it can be inferred that the water surface has reached the position of the first height H1 at which the antenna 21 is located. In other words, when the average attenuation amount of the first signal strength with respect to the reference signal strength exceeds −6 (dB) while the signal reception height H is set to the first height H1, it can be determined that the first height H1 is the water level.

For the above reason, in this embodiment, the predetermined value is set to −6 (dB).

Figure 8:
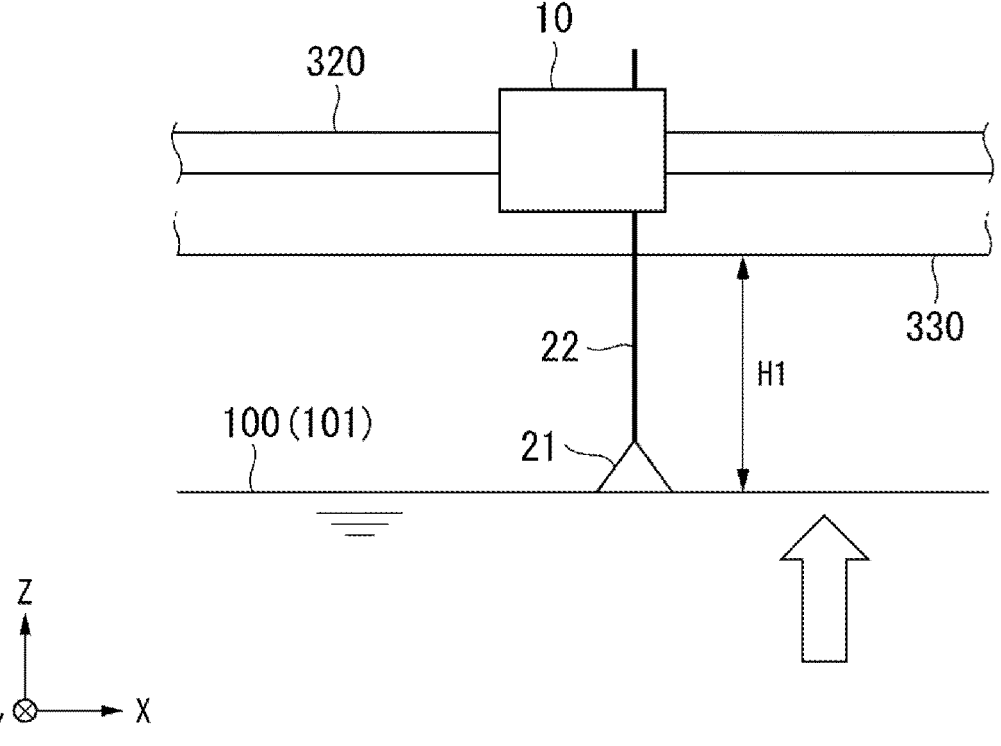
FIG. 8 is a diagram showing a state in which a water surface of a river reaches an antenna located at the first height.

FIG. 8 is a diagram showing a state in which the water surface 101 of the river 100 reaches the antenna 21 located at the first height H1. As shown in FIG. 8, it is assumed that the water surface 101 of the river 100 rises from the position shown in FIG. 5 and reaches the antenna 21 due to rising of the river 100. In this case, since the average attenuation amount of the first signal strength with respect to the reference signal strength exceeds −6 (dB) while the signal reception height H is set to the first height H1, the first control device 14 determines that the first height H1 is the water level.

As shown in FIG. 4, after determining that the first height H1 is the water level in step S6, the first control device 14 transmits first water level information to the management device 50 via the first communication device 12 (step S7). The first water level information is water level information including the water level determination result indicating that the first height H1 is the water level and the position information included in the acquired information together with the signal strength information used for the determination.

When the second control device 54 of the management device 50 receives the first water level information via the second communication device 52, the second control device 54 stores information indicating a correspondence relationship among the received first water level information, a reception time of the first water level information, and the identification information of the measurement device 10 in a storage region used as database of the water level information in storage regions of the second storage device 55. In addition, the second control device 54 causes the display device 53 to display an image for notifying the operator that the water level of the river 100 has reached the first height H1 based on the water level determination result included in the first water level information.

Figure 9:
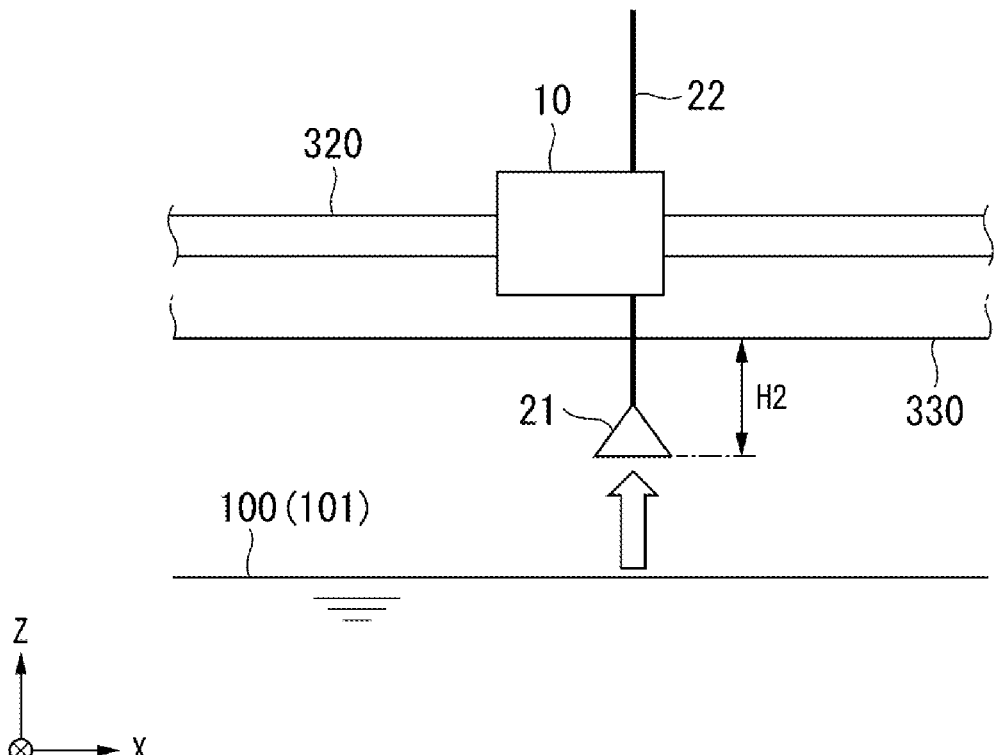
FIG. 9 is a diagram showing a state in which the signal reception height is adjusted to a second height.

After transmitting the first water level information to the management device 50, the first control device 14 of the measurement device 10 outputs a height command signal indicating a second height H2 different from the first height H1 as the target height of the signal reception height H to the first moving device 23, thereby moving the antenna 21 in the vertical direction so that the signal reception height H becomes the second height H2 (step S8). In this way, the first moving device 23 moves the antenna 21 from the position of the first height H1 to the position of the second height H2 when the first control device 14 determines that the average attenuation amount of the first signal strength exceeds the predetermined value while the antenna 21 is disposed at the position of the first height H1. FIG. 9 is a diagram showing a state in which the signal reception height H is adjusted to the second height H2. In FIG. 9, the water surface 101 of the river 100 is a water surface at the time when the signal reception height H is adjusted to the second height H2.

As described above, after the signal reception height H is adjusted to the second height H2, the GPS receiving device 24 calculates the position information based on each target radio signal received by the antenna 21 at the position of the second height H2, and calculates the SNR of each target radio signal received at the position of the second height H2. The GPS receiving device 24 calculates the position information and the SNR as described above at predetermined time intervals, and outputs the acquired information including the position information and the signal strength information to the first control device 14. Each time the acquired information is input from the GPS receiving device 24, the first control device 14 executes the processing of steps S9 and S10 described later.

When the acquired information is input from the GPS receiving device 24, the first control device 14 acquires the value of the SNR included in the signal strength information of the input acquired information as the second signal strength for each captured satellite, and calculates an attenuation amount of the second signal strength with respect to the reference signal strength for each captured satellite (step S9). For example, the first control device 14 calculates a difference between the reference signal strength and the second signal strength as the attenuation amount of the second signal strength with respect to the reference signal strength.

Then, the first control device 14 determines whether or not an average value of the attenuation amount of the second signal strength obtained for each captured satellite, that is, an average attenuation amount of the second signal strength, exceeds a predetermined value (step S10). As described above, as an example, the predetermined value is −6 (dB). When the average attenuation amount of the second signal strength does not exceed the predetermined value (step S10: No), the first control device 14 returns to the processing of step S9, and when the next acquired information is input from the GPS receiving device 24, the first control device 14 executes the processing of step S9 again. On the other hand, when the average attenuation amount of the second signal strength exceeds the predetermined value (step S10: Yes), the first control device 14 determines that the second height H2 is the water level (step S11).

Figure 10:
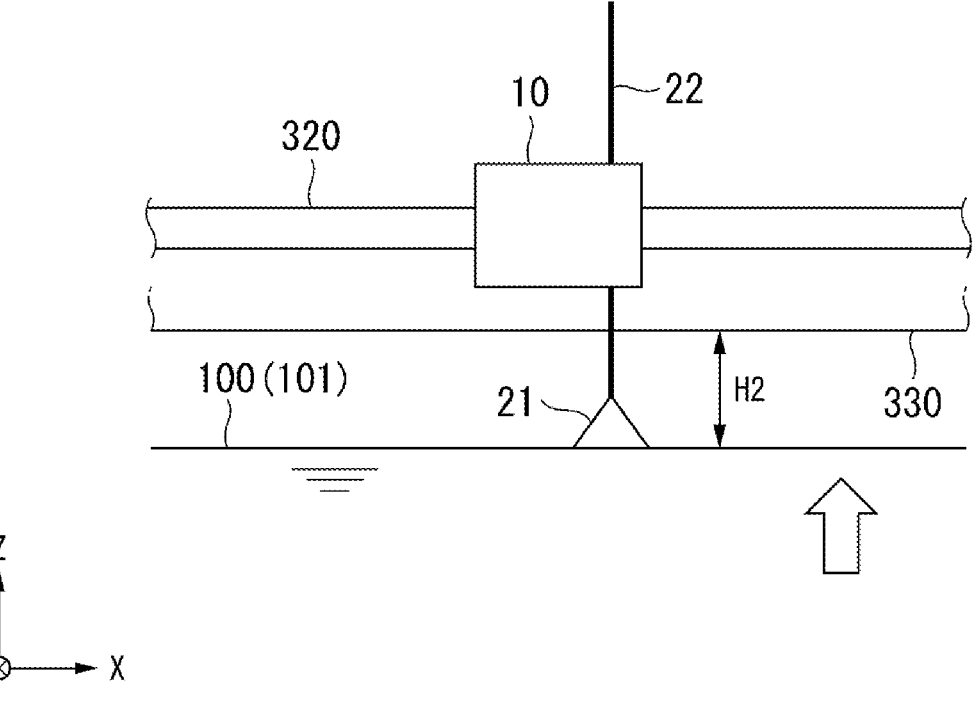
FIG. 10 is a diagram showing a state in which the water surface of the river reaches the antenna located at the second height.

FIG. 10 is a diagram showing a state in which the water surface 101 of the river 100 reaches the antenna 21 located at the second height H2. As shown in FIG. 10, it is assumed that the water surface 101 of the river 100 rises from the position shown in FIG. 9 and reaches the antenna 21 due to rising of the river 100. In this case, since the average attenuation amount of the second signal strength exceeds −6 (dB) while the signal reception height H is set to the second height H2, the first control device 14 determines that the second height H2 is the water level. After determining that the second height H2 is the water level in step S11, the first control device 14 transmits second water level information to the management device 50 via the first communication device 12 (step S12). The second water level information is water level information including the water level determination result indicating that the second height H2 is the water level and the position information included in the acquired information together with the signal strength information used for the determination.

When the second control device 54 of the management device 50 receives the second water level information via the second communication device 52, the second control device 54 stores information indicating a correspondence relationship among the received second water level information, a reception time of the second water level information, and the identification information of the measurement device 10 in a storage region used as database of the water level information in storage regions of the second storage device 55. Further, the second control device 54 causes the display device 53 to display an image for notifying the operator that the water level of the river 100 has reached the second height H2 based on the water level determination result included in the second water level information.

For example, when it is determined that the water level of the river 100 has reached the dangerous water level based on the water level determination result included in the second water level information, the second control device 54 causes the display device 53 to display a warning image for notifying the operator that the water level of the river 100 has reached the dangerous water level. When the management device 50 includes a speaker, the second control device 54 outputs an alarm sound from the speaker.

Also, as understood from the above description of the first water level determination processing, the program stored in the first storage device 15 of the measurement device 10 causes the first control device 14 to acquire the strength of the radio signal related to the position information received at the position of the first height H1 as the first signal strength, and determine that the first height H1 is the water level when the attenuation amount of the first signal strength with respect to the reference signal strength exceeds the predetermined value. The first control device 14 is one form of a computer.

Effects of First Embodiment

As described above, the measurement device 10 according to the first embodiment includes the acquisition device 11 that acquires, as the first signal strength, the strength of the radio signal related to the position information received at the position of the first height H1, and the first control device 14 that determines that the first height H1 is the water level when the attenuation amount of the first signal strength with respect to the reference signal strength exceeds the predetermined value.

As the antenna depth from the water surface increases, the attenuation amount of the signal strength with respect to the reference signal strength increases. Based on the correlation between the antenna depth and the attenuation amount of the signal strength, for example, when the attenuation amount of the first signal strength of the radio signal received at the first height H1 exceeds the predetermined value, it can be inferred that the water surface has reached the position of the first height H1. That is, when the attenuation amount of the first signal strength acquired at the position of the first height H1 exceeds the predetermined value, it is possible to determine that the first height H1 is the water level.

Accordingly, according to the first embodiment, the water level of the river 100 can be measured with high accuracy as compared with the technique disclosed in JP-A-2014-119266 in which the water level is measured based on the height information with relatively low accuracy included in the GPS information.

In the measurement device 10 of the first embodiment, the acquisition device 11 acquires the strength of the radio signal received at the position of the second height H2 different from the first height H1 as the second signal strength, and the first control device 14 determines that the second height H2 is the water level when the attenuation amount of the second signal strength with respect to the reference signal strength exceeds the predetermined value.

Thus, it is possible to detect that the water level of the river 100 has changed from the position of the first height H1 to the position of the second height H2.

In the measurement device 10 of the first embodiment, the acquisition device 11 includes one antenna 21 that receives the radio signal, the first moving device 23 that moves the antenna 21 from the position of the first height H1 to the position of the second height H2, and the GPS receiving device 24 that calculates the strength of the radio signal received by the antenna 21 at the position of the first height H1 as the first signal strength and calculates the strength of the radio signal received by the antenna 21 at the position of the second height H2 as the second signal strength.

By forming the acquisition device 11 to be configured as described above, it is possible to continuously adjust the height at which the antenna 21 is located, that is, the signal reception height H which is the height at which the radio signal is received.

In the measurement device 10 of the first embodiment, the first moving device 23 moves the antenna 21 from the position of the first height H1 to the position of the second height H2 when the first control device 14 determines that the attenuation amount of the first signal strength exceeds the predetermined value while the antenna 21 is disposed at the position of the first height H1.

Thus, when the water level of the river 100 rises due to rising water or the like, a change in the water level can be tracked.

The program stored in the first storage device 15 of the measurement device 10 according to the first embodiment causes the first control device 14 to acquire the strength of the radio signal related to the position information received at the position of the first height H1 as the first signal strength, and determine that the first height H1 is the water level when the attenuation amount of the first signal strength with respect to the reference signal strength exceeds the predetermined value.

According to such a program, the water level of the river 100 can be measured with high accuracy as compared with the technique of JP-A-2014-119266 in which the water level is measured based on the height information with relatively low accuracy included in the GPS information.

Second Embodiment

A second embodiment will be described below. In each embodiment exemplified below, the same reference numerals as those used in the first embodiment will be assigned to configurations common to the first embodiment, and detailed description thereof will be omitted as appropriate.

Figure 11:
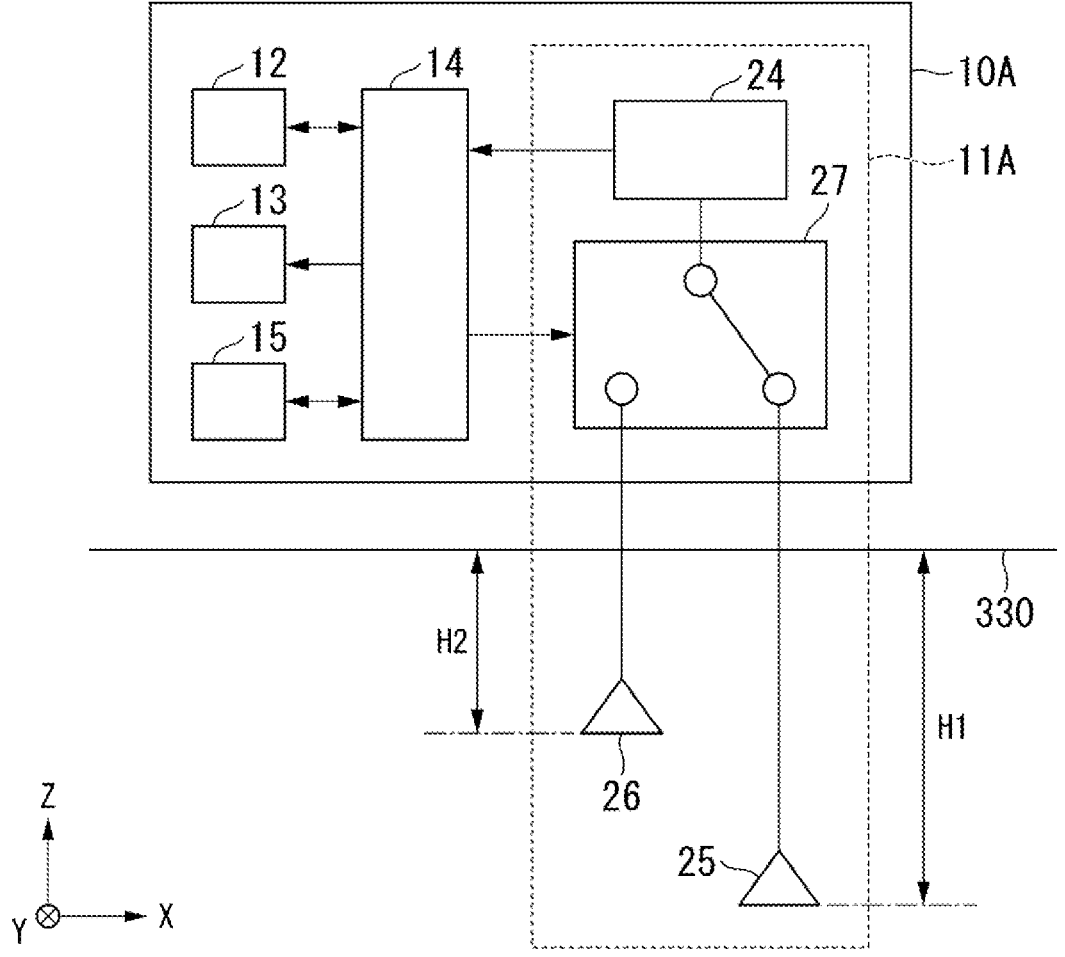
FIG. 11 is a block diagram schematically showing a schematic configuration of a measurement device according to a second embodiment.

FIG. 11 is a block diagram schematically showing a schematic configuration of a measurement device 10A of a second embodiment. The measurement device 10A of the second embodiment is different from the measurement device 10 of the first embodiment in that an acquisition device 11A different from the acquisition device 11 of the first embodiment is provided. The acquisition device 11A includes a GPS receiving device 24, a first antenna 25, a second antenna 26, and a switch 27.

The first antenna 25 is disposed in advance at a position where the signal reception height H is the first height H1. That is, the first antenna 25 receives the radio signals transmitted from the GPS satellites at the position of the first height H1. The second antenna 26 is disposed in advance at a position where the signal reception height H is the second height H2 different from the first height H1. That is, the second antenna 26 receives the radio signals transmitted from the GPS satellites at the position of the second height H2. As an example, a distance on the Z axis between the first antenna 25 and the second antenna 26 is 10 (cm).

The switch 27 switches an antenna electrically coupled to the GPS receiving device 24 between the first antenna 25 and the second antenna 26 in accordance with a coupling switching signal input from the first control device 14. For example, when the coupling switching signal is a low-level signal, the switch 27 electrically couples the first antenna 25 to the GPS receiving device 24. On the other hand, when the coupling switching signal is a high-level signal, the switch 27 electrically couples the second antenna 26 to the GPS receiving device 24.

When the first antenna 25 is electrically coupled to the GPS receiving device 24, the GPS receiving device 24 calculates the position information based on each target radio signal received at the position of the first height H1 by the first antenna 25, and calculates the SNR of each target radio signal received at the position of the first height H1. When the second antenna 26 is electrically coupled to the GPS receiving device 24, the GPS receiving device 24 calculates the position information based on each target radio signal received by the second antenna 26 at the position of the second height H2, and calculates the SNR of each target radio signal received at the position of the second height H2.

The acquisition device 11 of the first embodiment includes a mechanism for moving one antenna 21 in the vertical direction, thereby enabling continuous adjustment of the signal reception height H. On the other hand, the acquisition device 11A of the second embodiment includes a mechanism for performing switching between the first antenna 25 and the second antenna 26 having different signal reception heights H, thereby enabling stepwise adjustment of the signal reception height H.

Figure 12:
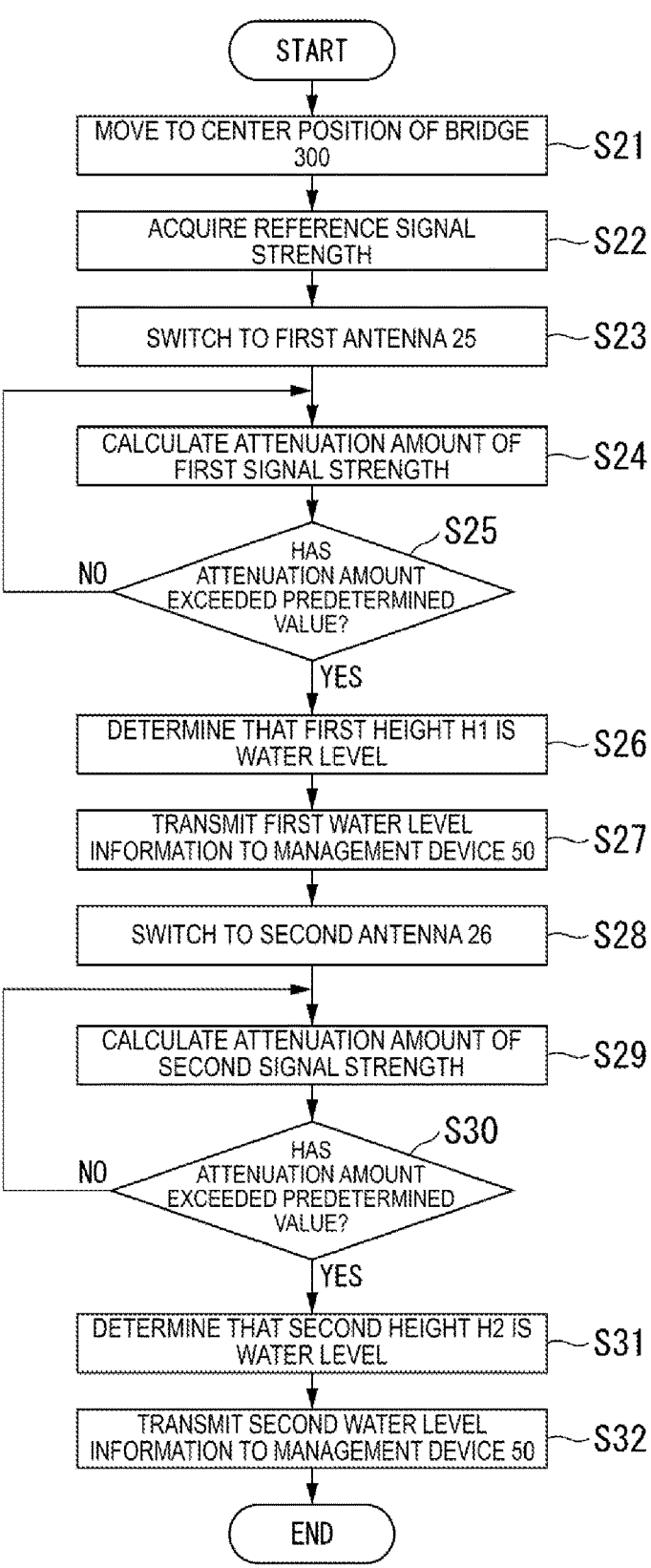
FIG. 12 is a flowchart showing second water level determination processing executed by a first control device of the measurement device of the second embodiment.

FIG. 12 is a flowchart showing second water level determination processing executed by the first control device 14 of the measurement device 10A. When receiving the water level measurement command from the management device 50 via the first communication device 12, the first control device 14 reads and executes the program from the first storage device 15, thereby executing the second water level determination processing shown in FIG. 12. Also, description of the content of the second water level determination processing that overlaps the content of the first water level determination processing will be omitted or simplified.

As shown in FIG. 12, when the second water level determination processing is started, the first control device 14 first outputs the position command signal indicating the center position of the bridge 300 as the target position in the horizontal direction to the second moving device 13, thereby moving the measurement device 10 so that the position of the antenna 21 in the horizontal direction becomes the center position of the bridge 300 (step S21). Since the content of step S21 is the same as the content of step S1 included in the first water level determination processing described in the first embodiment, detailed description thereof will be omitted.

After the measurement device 10 is moved to the center position of the bridge 300, the first control device 14 activates the GPS receiving device 24 to acquire the reference signal strength for each captured satellite (step S22). Since the content of step S22 is substantially the same as the content of step S2 included in the first water level determination processing described in the first embodiment, detailed description thereof will be omitted. However, in the second embodiment, the first control device 14 acquires the reference signal strength using one of the first antenna 25 and the second antenna 26.

For example, when the second antenna 26 is used, the first control device 14 outputs a coupling switching signal, which is a high-level signal, to the switch 27. Thus, the switch 27 electrically couples the second antenna 26 to the GPS receiving device 24. The GPS receiving device 24 calculates the position information based on each target radio signal received by the second antenna 26 at the position of the second height H2, and calculates the SNR of each target radio signal received at the position of the second height H2.

The GPS receiving device 24 calculates the position information and the SNR as described above at predetermined time intervals, and outputs the acquired information including the position information and the signal strength information to the first control device 14. After the activation of the GPS receiving device 24, the first control device 14 first acquires the value of the SNR for each captured satellite included in the signal strength information obtained from the GPS receiving device 24 as the reference signal strength for each captured satellite.

Subsequently, the first control device 14 outputs a coupling switching signal, which is a low-level signal, to the switch 27 to switch the antenna electrically coupled to the GPS receiving device 24 to the first antenna 25 (step S23). Thus, the signal reception height H is adjusted to the first height H1.

As described above, after the signal reception height H is adjusted to the first height H1, the GPS receiving device 24 calculates the position information based on each target radio signal received by the first antenna 25 at the position of the first height H1, and calculates the SNR of each target radio signal received at the position of the first height H1. The GPS receiving device 24 calculates the position information and the SNR as described above at predetermined time intervals, and outputs the acquired information including the position information and the signal strength information to the first control device 14. Each time the acquired information is input from the GPS receiving device 24, the first control device 14 executes the processing of steps S24 and S25 described later. In addition, in the second embodiment, it is not always necessary for the GPS receiving device 24 to calculate the position information.

When the acquired information is input from the GPS receiving device 24, the first control device 14 acquires the value of the SNR included in the signal strength information of the input acquired information as the first signal strength for each correction satellite, and calculates the attenuation amount of the first signal strength with respect to the reference signal strength for each captured satellite (step S24).

Then, the first control device 14 determines whether or not the average value of the attenuation amount of the first signal strength obtained for each captured satellite, that is, the average attenuation amount of the first signal strength, exceeds a predetermined value (step S25). Similarly to the first embodiment, as an example, the predetermined value is −6 (dB). When the average attenuation amount of the first signal strength does not exceed the predetermined value (step S25: No), the first control device 14 returns to the processing of step S24, and when the next acquired information is input from the GPS receiving device 24, the first control device 14 executes the processing of step S24 again. On the other hand, when the average attenuation amount of the first signal strength exceeds the predetermined value (step S25: Yes), the first control device 14 determines that the first height H1 is the water level (Step S26).

After determining that the first height H1 is the water level in step S26, the first control device 14 transmits the first water level information to the management device 50 via the first communication device 12 (step S27). The second control device 54 of the management device 50 performs the same processing as that of the first embodiment based on the first water level information.

After transmitting the first water level information to the management device 50, the first control device 14 outputs a coupling switching signal, which is a high-level signal, to the switch 27, thereby switching the antenna electrically coupled to the GPS receiving device 24 to the second antenna 26 (step S28). Thus, the signal reception height H is adjusted to the second height H2. In this way, when the first control device 14 determines that the attenuation amount of the first signal strength exceeds the predetermined value while the GPS receiving device 24 is electrically coupled to the first antenna 25, the switch 27 switches the antenna electrically coupled to the GPS receiving device 24 from the first antenna 25 to the second antenna 26.

As described above, after the signal reception height H is adjusted to the second height H2, the GPS receiving device 24 calculates the position information based on each target radio signal received by the second antenna 26 at the position of the second height H2, and calculates the SNR of each target radio signal received at the position of the second height H2. The GPS receiving device 24 calculates the position information and the SNR as described above at predetermined time intervals, and outputs the acquired information including the position information and the signal strength information to the first control device 14. Each time the acquired information is input from the GPS receiving device 24, the first control device 14 executes the processing of steps S29 and S30 described later.

When the acquired information is input from the GPS receiving device 24, the first control device 14 acquires the value of the average SNR included in the signal strength information of the input acquired information as the second signal strength for each captured satellite, and calculates the attenuation amount of the second signal strength with respect to the reference signal strength for each captured satellite (step S29).

Then, the first control device 14 determines whether or not the average value of the attenuation amount of the second signal strength obtained for each captured satellite, that is, the average attenuation amount of the second signal strength, exceeds a predetermined value (step S30). When the average attenuation amount of the second signal strength does not exceed the predetermined value (step S30: No), the first control device 14 returns to the processing of step S29, and when the next acquired information is input from the GPS receiving device 24, the first control device 14 executes the processing of step S29 again. On the other hand, when the average attenuation amount of the second signal strength exceeds the predetermined value (step S30: Yes), the first control device 14 determines that the second height H2 is the water level (step S31).

After determining that the second height H2 is the water level in step S31, the first control device 14 transmits the second water level information to the management device 50 via the first communication device 12 (step S32). The second control device 54 of the management device 50 performs the same processing as that of the first embodiment based on the second water level information.

Effects of Second Embodiment

As described above, in the measurement device 10A of the second embodiment, the acquisition device 11A includes the first antenna 25 that receives the radio signal at the first height H1, the second antenna 26 that receives the radio signal at the second height H2, the GPS receiving device 24 that calculates the strength of the radio signal received by the first antenna 25 at the position of the first height H1 as the first signal strength and calculates the strength of the radio signal received by the second antenna 26 at the position of the second height H2 as the second signal strength, and the switch 27 that switches the antenna electrically coupled to the GPS receiving device 24 between the first antenna 25 and the second antenna 26.

According to the second embodiment, by forming the acquisition device 11A to be configured as described above, it is possible to adjust the signal reception height H, which is the height of the position where the radio signal is received, in a stepwise manner.

In the measurement device 10A of the second embodiment, when the first control device 14 determines that the attenuation amount of the first signal strength exceeds the predetermined value while the GPS receiving device 24 is electrically coupled to the first antenna 25, the switch 27 switches the antenna electrically coupled to the GPS receiving device 24 from the first antenna 25 to the second antenna 26.

Thus, when the water level of the river 100 rises due to rising water or the like, a change in the water level can be tracked.

Third Embodiment

A third embodiment will be described below.

In the third embodiment, a form will be described in which a height of the water level in a river width direction of the river 100 is measured using the same measurement device 10 as that of the first embodiment. In addition, in the embodiment, the river width direction is a direction along the X axis.

Figure 13:
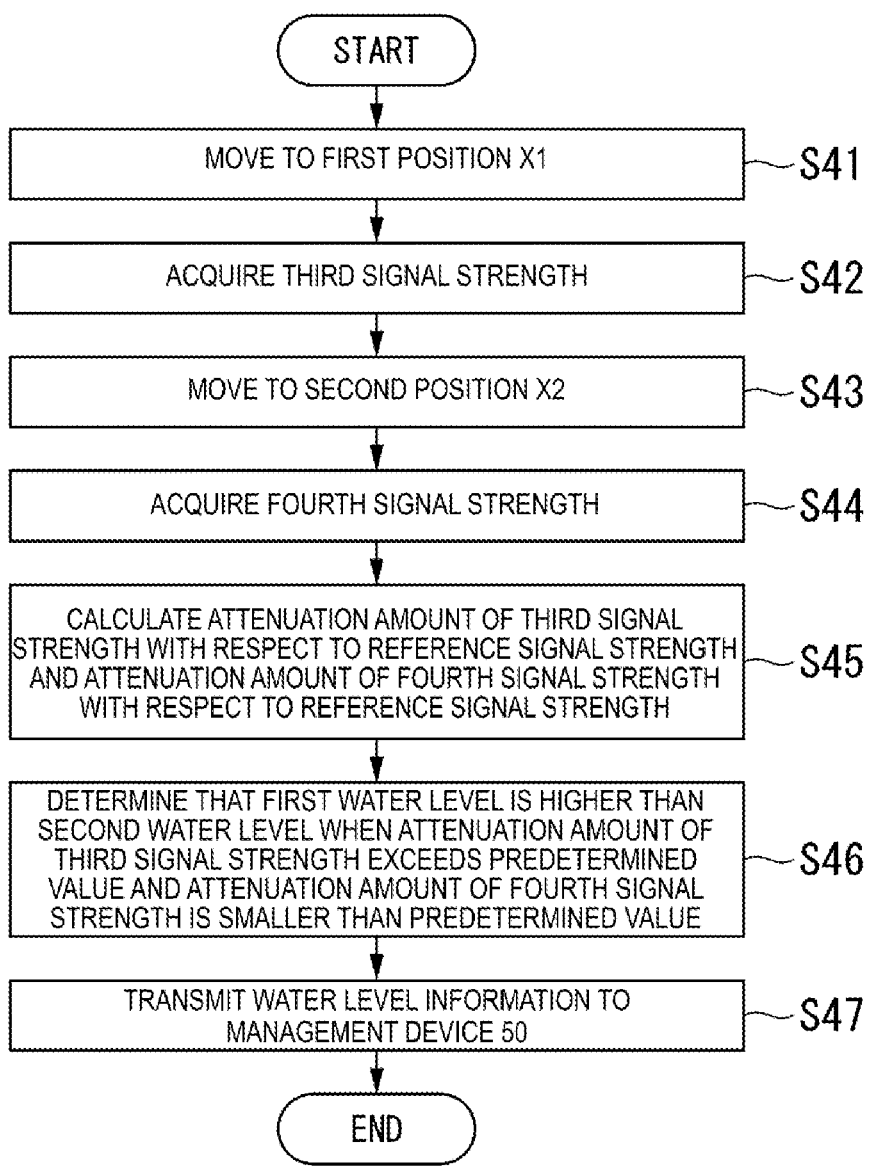
FIG. 13 is a flowchart showing third water level determination processing executed by a first control device of a measurement device according to a third embodiment.

FIG. 13 is a flowchart showing third water level determination processing executed by the first control device 14 of the measurement device 10 in the third embodiment. When receiving the water level measurement command from the management device 50 via the first communication device 12, the first control device 14 reads and executes the program from the first storage device 15, thereby executing the third water level determination processing shown in FIG. 13.

As shown in FIG. 13, when the third water level determination processing is started, the first control device 14 outputs a position command signal indicating a first position X1 as the target position in the horizontal direction to the second moving device 13, thereby moving the measurement device 10 in the horizontal direction so that the position of the antenna 21 in the horizontal direction becomes the first position X1 (step S41).

After the position of the antenna 21 in the horizontal direction is adjusted to the first position X1, the GPS receiving device 24 calculates the position information based on each target radio signal received by the antenna 21 at the position of the first position X1, and calculates the SNR of each target radio signal received at the position of the first position X1. Also, the signal reception height H is adjusted to a predetermined height in advance. After calculating the position information and the SNR, the GPS receiving device 24 outputs the acquired information including the position information and the signal strength information to the first control device 14.

When the acquired information is input from the GPS receiving device 24, the first control device 14 acquires the value of the SNR included in the signal strength information of the input acquired information as a third signal strength for each captured satellite (step S42). The first control device 14 stores the acquired third signal strength in the first storage device 15.

Subsequently, the first control device 14 outputs a position command signal indicating a second position X2 different from the first position X1 as the target position in the horizontal direction to the second moving device 13, thereby moving the measurement device 10 in the horizontal direction so that the position of the antenna 21 in the horizontal direction becomes the second position X2 (step S43).

After the position of the antenna 21 in the horizontal direction is adjusted to the second position X2, the GPS receiving device 24 calculates the position information based on each target radio signal received by the antenna 21 at the position of the second position X2, and calculates the SNR of each target radio signal received at the position of the second position X2. After calculating the position information and the SNR, the GPS receiving device 24 outputs the acquired information including the position information and the signal strength information to the first control device 14.

When the acquired information is input from the GPS receiving device 24, the first control device 14 acquires the value of the SNR included in the signal strength information of the input acquired information as a fourth signal strength for each captured satellite (step S44). The first control device 14 stores the acquired fourth signal strength in the first storage device 15.

The first control device 14 reads the reference signal strength, the third signal strength, and the fourth signal strength from the first storage device 15, and calculates an attenuation amount of the third signal strength with respect to the reference signal strength and an attenuation amount of the fourth signal strength with respect to the reference signal strength for each captured satellite (step S45). Also, although the step of acquiring the reference signal strength is omitted in FIG. 13, if necessary, the first control device 14 may execute the step of acquiring the reference signal strength described in the first embodiment.

Then, when an average value of the attenuation amount of the third signal strength with respect to the reference signal strength obtained for each captured satellite, that is, an average attenuation amount of the third signal strength, exceeds a predetermined value, and an average value of the attenuation amount of the fourth signal strength with respect to the reference signal strength obtained for each captured satellite, that is, an average attenuation amount of the fourth signal strength, is smaller than the predetermined value, the first control device 14 determines that the water level at the first position X1 is higher than the water level at the second position X2 (step S46). As in the first embodiment, the predetermined value is −6 (dB). In the following description, the water level at the first position X1 may be referred to as a "first water level", and the water level at the second position X2 may be referred to as a "second water level".

Figure 14:
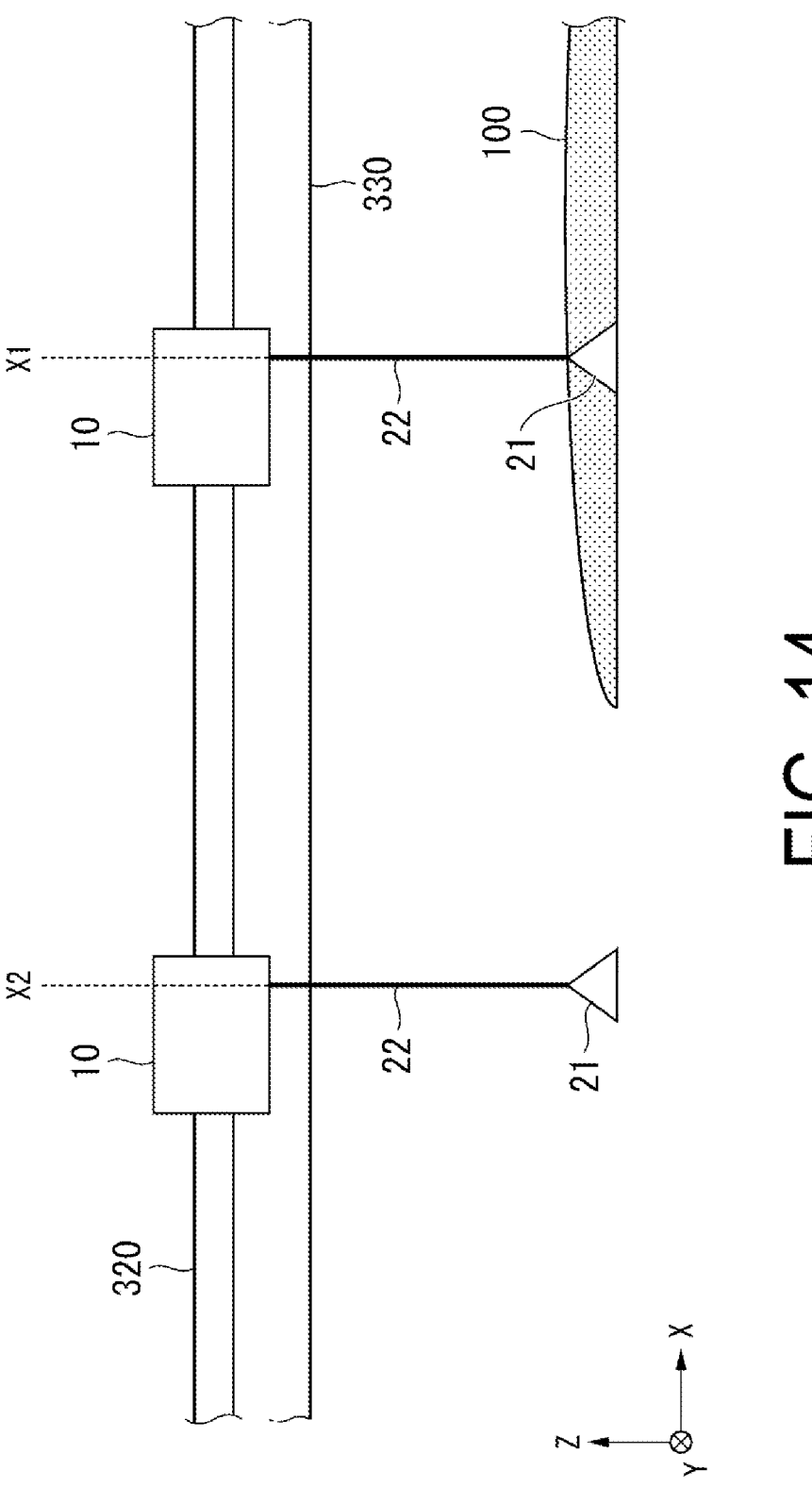
FIG. 14 is a diagram showing a state in which the signal strength is measured at each of a first position and a second position.

FIG. 14 is a diagram showing a state in which the signal strength is measured at each of the first position X1 and the second position X2. For example, as shown in FIG. 14, when the water level of the river 100 at the first position X1 is higher than the water level at the second position X2, the condition that the average attenuation amount of the third signal strength exceeds the predetermined value and the average attenuation amount of the fourth signal strength is smaller than the predetermined value is satisfied. Accordingly, when the average attenuation amount of the third signal strength exceeds the predetermined value and the average attenuation amount of the fourth signal strength is smaller than the predetermined value, it can be determined that the first water level is higher than the second water level.

As shown in FIG. 13, after determining that the first water level is higher than the second water level, the first control device 14 transmits the water level information to the management device 50 via the first communication device 12 (step S47). At this time, the water level information transmitted to the management device 50 includes the determination result that the first water level is higher than the second water level, the position information included in the acquired information from which the third signal strength is obtained, and the position information included in the acquired information from which the fourth signal strength is obtained.

The position information included in the acquired information from which the third signal strength is obtained is information indicating the position of the river 100 whose water level is the first water level. Also, the position information included in the acquired information from which the fourth signal strength is obtained is information indicating the position of the river 100 whose water level is the second water level. For example, the second control device 54 of the management device 50 causes the display device 53 to display an image for notifying the operator of a position at which the water level is the first water level and a position at which the water level is the second water level in the river 100.

Effects of Third Embodiment

As described above, the measurement device 10 of the third embodiment includes the second moving device 13 that moves the acquisition device 11 to each of the first position X1 and the second position X2 different from the first position X1, and the acquisition device 11 acquires the position information of the first position X1 based on the radio signal received at the first position X1 and acquires the position information of the second position X2 based on the radio signal received at the second position X2.

According to the third embodiment, the water level can be measured at a plurality of positions in the river 100. Also, as the position information indicating the position at which the water level is measured, position information obtained by a position measurement system using a satellite such as a GPS can be acquired.

In the measurement device 10 of the third embodiment, the acquisition device 11 acquires the strength of the radio signal received at the first position X1 as the third signal strength and acquires the strength of the radio signal received at the second position X2 as the fourth signal strength, and when the attenuation amount of the third signal strength with respect to the reference signal strength exceeds the predetermined value and the attenuation amount of the fourth signal strength with respect to the reference signal strength is smaller than the predetermined value, the first control device 14 determines that the water level at the first position X1 is higher than the water level at the second position X2.

Thus, it is possible to measure the height of the water level at a plurality of positions in the river 100.

Fourth Embodiment

A fourth embodiment will be described below.

In the fourth embodiment, another example of the form in which the height of the water level in the river width direction of the river 100 is measured using the same measurement device 10 as that of the first embodiment will be described.

Figure 15:
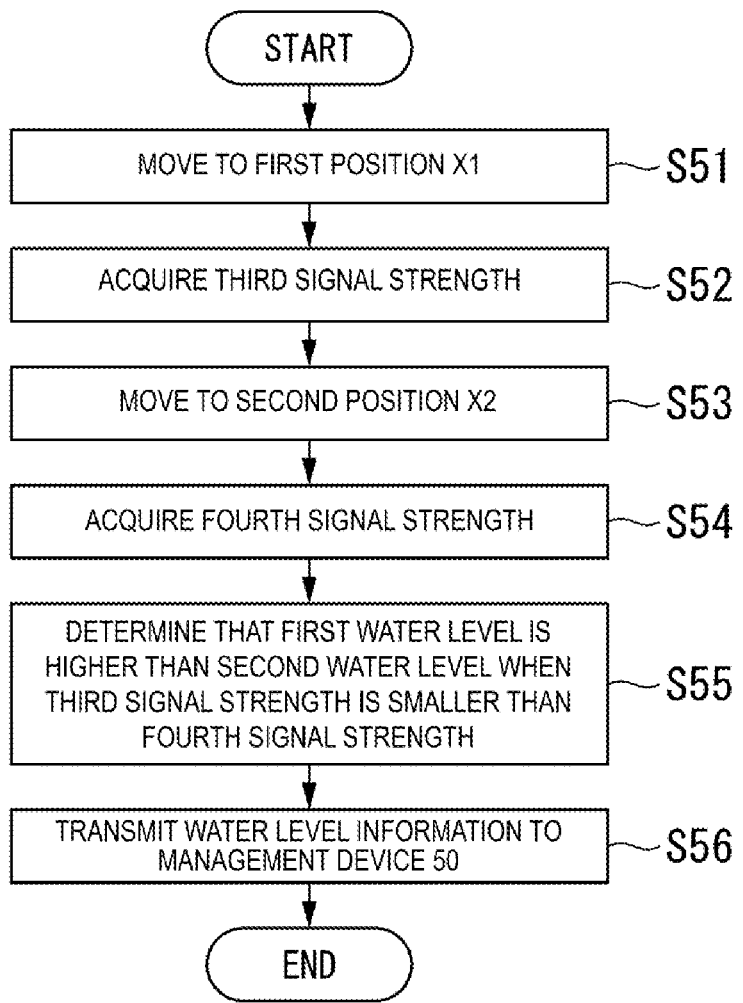
FIG. 15 is a flowchart showing fourth water level determination processing executed by a first control device of a measurement device according to a fourth embodiment.

FIG. 15 is a flowchart showing fourth water level determination processing executed by the first control device 14 of the measurement device 10 in the fourth embodiment. When the first control device 14 receives the water level measurement command from the management device 50 via the first communication device 12, the first control device 14 reads and executes the program from the first storage device 15, thereby executing fourth water level determination processing shown in FIG. 15. Also, description of the content of the fourth water level determination processing that overlaps the content of the third water level determination processing will be omitted or simplified.

Among steps included in the fourth water level determination processing, processing from step S51 to step S54 are the same as the processing from step S41 to step S44 of the third water level determination processing, and thus description of these steps S51 to S54 will be omitted.

Explaining from step S55 shown in FIG. 15, when the third signal strength acquired at the first position X1 is smaller than the fourth signal strength acquired at the second position X2, the first control device 14 determines that the water level at the first position X1 is higher than the water level at the second position X2 (step S55).

As shown in FIG. 14, when the water level of the river 100 at the first position X1 is higher than the water level at the second position X2, the condition that the third signal strength is smaller than the fourth signal strength is satisfied. Accordingly, when the third signal strength is smaller than the fourth signal strength, it can be determined that the first water level is higher than the second water level.

As shown in FIG. 15, after determining that the first water level is higher than the second water level, the first control device 14 transmits the water level information to the management device 50 via the first communication device 12 (step S56). At this time, the water level information transmitted to the management device 50 includes the information described in the third embodiment. Similarly to the third embodiment, the second control device 54 of the management device 50 causes the display device 53 to display the image for notifying the operator of the position at which the water level is the first water level and the position at which the water level is the second water level in the river 100.

Effects of Fourth Embodiment

As described above, in the measurement device 10 of the fourth embodiment, the acquisition device 11 acquires the strength of the radio signal received at the first position X1 as the third signal strength and acquires the strength of the radio signal received at the second position X2 as the fourth signal strength, and when the third signal strength is smaller than the fourth signal strength, the first control device 14 determines that the water level at the first position X1 is higher than the water level at the second position X2.

According to the fourth embodiment, it is possible to measure the height of the water level at a plurality of positions in the river 100. Also, as the position information indicating the position at which the water level is measured, position information obtained by a position measurement system using a satellite such as a GPS can be acquired.

Fifth Embodiment

A fifth embodiment will be described below.

In the fifth embodiment, a form will be described in which a position of a water area in the river width direction of the river 100 is measured using the same measurement device 10 as that of the first embodiment. The position of the water area is a position of an edge of the river 100 in the river width direction. In other words, the position of the water area is a position of a boundary between the river 100 and a river bank.

Figure 16:
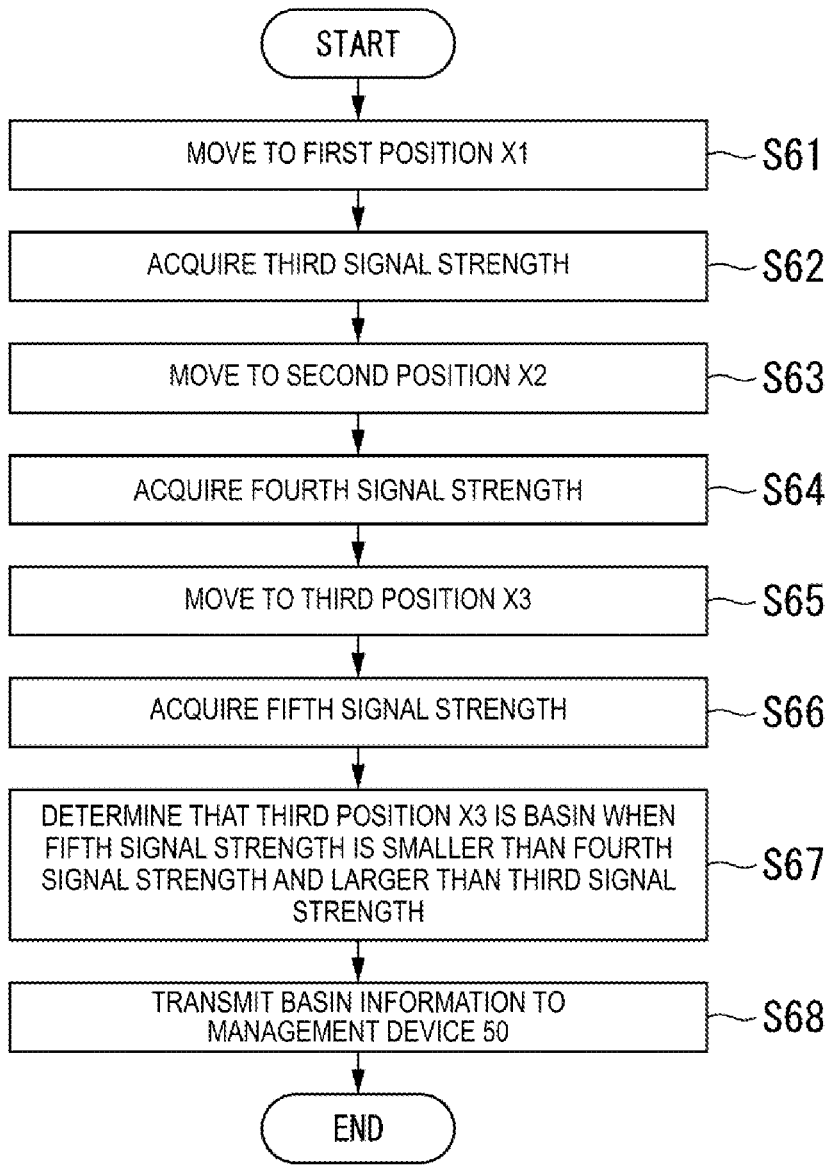
FIG. 16 is a flowchart showing first water area determination processing executed by a first control device of a measurement device according to a fifth embodiment.

FIG. 16 is a flowchart showing first water area determination processing executed by the first control device 14 of the measurement device 10 in the fifth embodiment. When a water area measurement command is received from the management device 50 via the first communication device 12, the first control device 14 reads and executes the program from the first storage device 15, thereby executing the first water area determination processing shown in FIG. 16.

As shown in FIG. 16, when the first water area determination processing is started, the first control device 14 outputs the position command signal indicating the first position X1 as the target position in the horizontal direction to the second moving device 13, thereby moving the measurement device 10 in the horizontal direction so that the position of the antenna 21 in the horizontal direction becomes the first position X1 (step S61).

After the position of the antenna 21 in the horizontal direction is adjusted to the first position X1, the GPS receiving device 24 calculates the position information based on each target radio signal received by the antenna 21 at the position of the first position X1, and calculates the SNR of each target radio signal received at the position of the first position X1. Further, the signal reception height H is adjusted to a predetermined height in advance. After calculating the position information and the SNR, the GPS receiving device 24 outputs the acquired information including the position information and the signal strength information to the first control device 14.

When the acquired information is input from the GPS receiving device 24, the first control device 14 acquires the value of the SNR included in the signal strength information of the input acquired information as the third signal strength for each captured satellite (step S62). The first control device 14 stores the acquired third signal strength in the first storage device 15.

Subsequently, the first control device 14 outputs the position command signal indicating the second position X2 different from the first position X1 as the target position in the horizontal direction to the second moving device 13, thereby moving the measurement device 10 in the horizontal direction so that the position of the antenna 21 in the horizontal direction becomes the second position X2 (step S63).

After the position of the antenna 21 in the horizontal direction is adjusted to the second position X2, the GPS receiving device 24 calculates the position information based on each target radio signal received by the antenna 21 at the position of the second position X2, and calculates the SNR of each target radio signal received at the position of the second position X2. After calculating the position information and the SNR, the GPS receiving device 24 outputs the acquired information including the position information and the signal strength information to the first control device 14.

When the acquired information is input from the GPS receiving device 24, the first control device 14 acquires the value of the SNR included in the signal strength information of the input acquired information as the fourth signal strength for each captured satellite (step S64). The first control device 14 stores the acquired fourth signal strength in the first storage device 15.

Subsequently, the first control device 14 outputs the position command signal indicating a third position X3 between the first position X1 and the second position X2 as the target position in the horizontal direction to the second moving device 13, thereby moving the measurement device 10 in the horizontal direction so that the position of the antenna 21 in the horizontal direction becomes the third position X3 (step S65).

After the position of the antenna 21 in the horizontal direction is adjusted to the third position X3, the GPS receiving device 24 calculates the position information based on each target radio signal received by the antenna 21 at the position of the third position X3, and calculates the SNR of each target radio signal received at the position of the third position X3. After calculating the position information and the SNR, the GPS receiving device 24 outputs the acquired information including the position information and the signal strength information to the first control device 14.

When the acquired information is input from the GPS receiving device 24, the first control device 14 acquires the value of the SNR included in the signal strength information of the input acquired information as a fifth signal strength for each captured satellite (step S66). The first control device 14 stores the acquired fifth signal strength in the first storage device 15.

Then, the first control device 14 reads the third signal strength, the fourth signal strength, and the fifth signal strength from the first storage device 15, and when the fifth signal strength is smaller than the fourth signal strength and larger than the third signal strength, it determines that the third position X3 is the water area (basin) (step S67).

Figure 17:
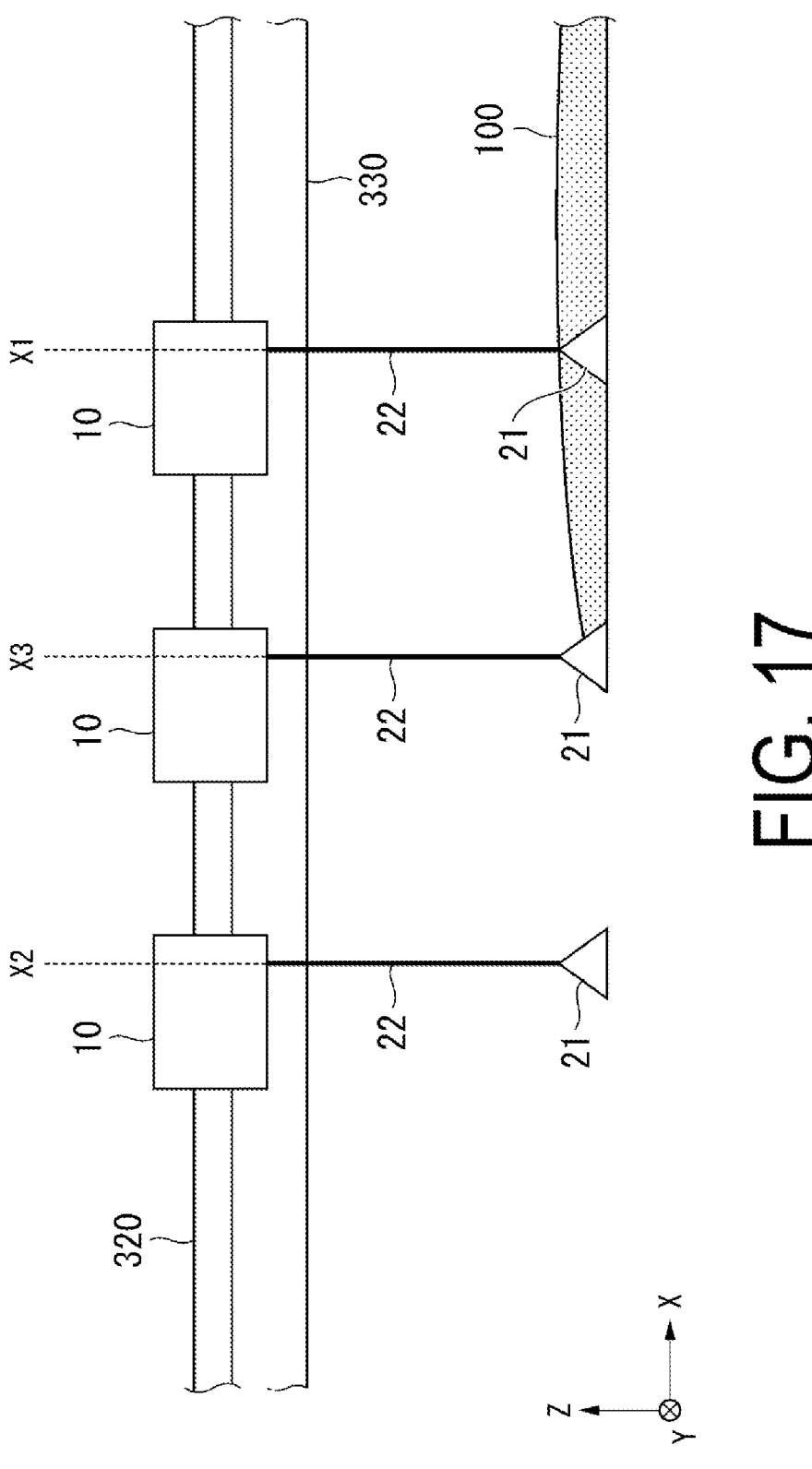
FIG. 17 is a diagram showing a state in which the signal strength is measured at each of a first position, a second position, and a third position.

FIG. 17 is a diagram showing a state in which the signal strength is measured at each of the first position X1, the second position X2, and the third position X3. For example, as shown in FIG. 17, when the third position X3 is the water area of the river 100, the condition that the fifth signal strength is smaller than the fourth signal strength and larger than the third signal strength is satisfied. Accordingly, when the fifth signal strength is smaller than the fourth signal strength and larger than the third signal strength, it can be determined that the third position X3 is the water area.

As shown in FIG. 16, after determining that the third position X3 is the water area (basin), the first control device 14 transmits water area information to the management device 50 via the first communication device 12 (Step S68). At this time, the water area (basin) information transmitted to the management device 50 includes the determination result indicating that the third position X3 is the water area (basin) and the position information included in the acquired information from which the fifth signal strength is obtained.

The position information included in the acquired information from which the fifth signal strength is obtained is information indicating a position of the water area of the river 100. For example, the second control device 54 of the management device 50 causes the display device 53 to display an image for notifying the operator of the position of the water area of the river 100 based on the water area information.

Effects of Fifth Embodiment

As described above, in the measurement device 10 of the fifth embodiment, the second moving device 13 moves the acquisition device 11 to the third position X3 between the first position X1 and the second position X2, the acquisition device 11 acquires the position information of the third position X3 based on the radio signal received at the third position X3, the acquisition device 11 acquires the strength of the radio signal received at the first position X1 as the third signal strength, acquires the strength of the radio signal received at the second position X2 as the fourth signal strength, and acquires the strength of the radio signal received at the third position X3 as the fifth signal strength, and when the fifth signal strength is smaller than the fourth signal strength and larger than the third signal strength, the first control device 14 determines that the third position X3 is the water area.

According to the fifth embodiment, the position of the water area of the river 100 can be measured. Also, as the position information indicating the position of the water area, position information obtained by a position measurement system using a satellite such as a GPS can be acquired.

Sixth Embodiment

A sixth embodiment will be described below.

In the sixth embodiment, a form in which determination of the water level performed by the measurement device 10 of the first embodiment and the measurement device 10A of the second embodiment is performed by the management device 50 will be described. Also, for convenience of description, the sixth embodiment will be described using the measurement device 10 and the management device 50 of the first embodiment. The management device 50 according to the sixth embodiment and seventh to ninth embodiments described later corresponds to an information processing device. In addition, in the sixth embodiment to the ninth embodiment, the second control device 54 corresponds to a second determination device, and the second communication device 52 corresponds to a communication device.

Figure 18:
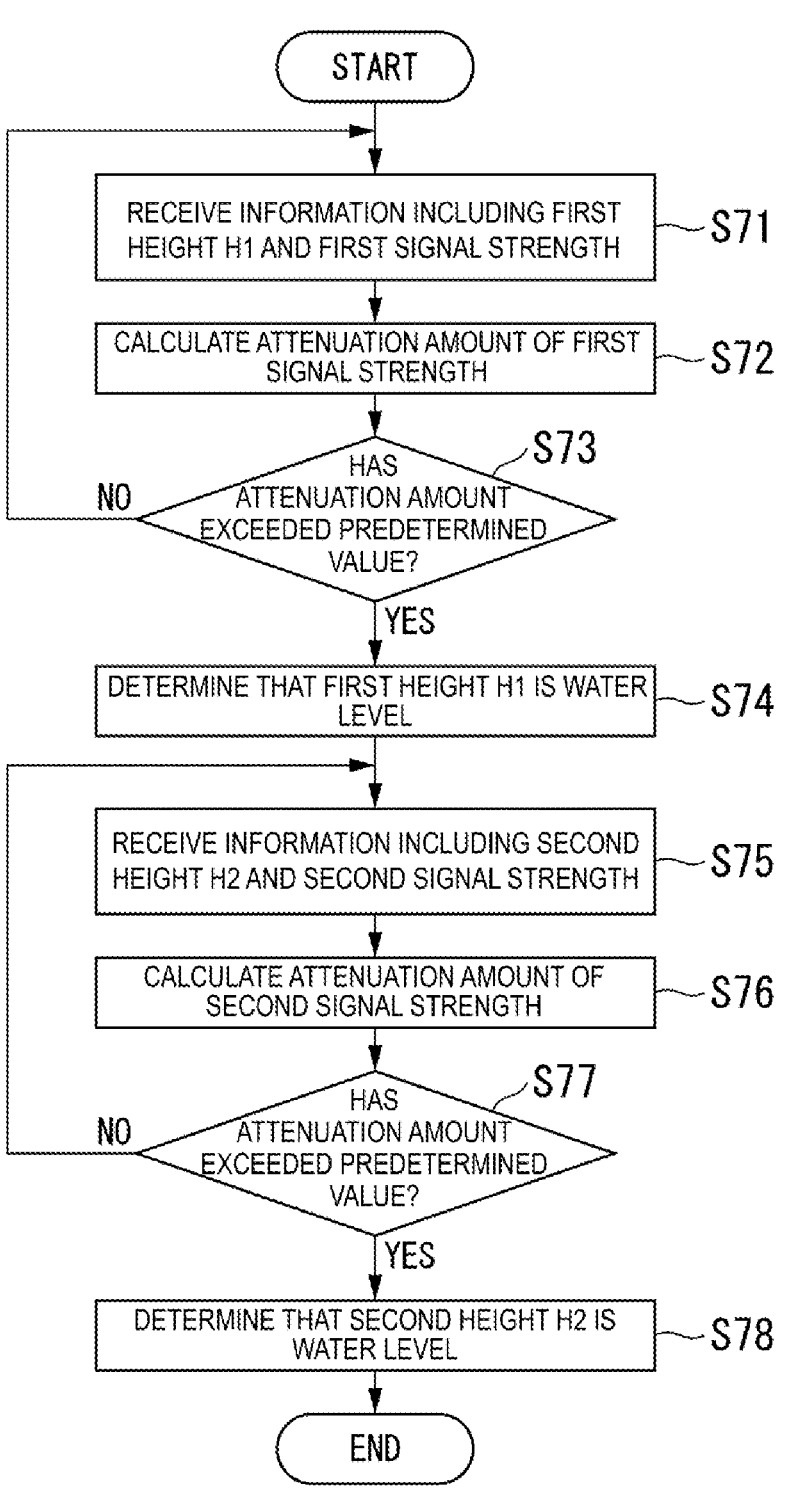
FIG. 18 is a flowchart showing fifth water level determination processing executed by a second control device of a management device according to a sixth embodiment.

FIG. 18 is a flowchart showing fifth water level determination processing executed by the second control device 54 of the management device 50 according to the sixth embodiment. When the second control device 54 determines that the operation for starting the water level measurement is received based on the operation signal input from the input device 51, the second control device 54 reads and executes the program from the second storage device 55, thereby executing the fifth water level determination processing shown in FIG. 18.

As shown in FIG. 18, when starting the fifth water level determination processing, the second control device 54 first receives information including the first height H1 and the first signal strength obtained for each captured satellite from the measurement device 10 via the second communication device 52 (step S71). As described in the first embodiment, the first signal strength is the value of the SNR of each target radio signal received at the position of the first height H1. That is, in the sixth embodiment, the second communication device 52 receives information including the first height H1 and the first signal strength indicating the strength of the radio signal related to the position information received at the position of the first height H1. Also, as described in the second embodiment, such information can also be received from the measurement device 10A of the second embodiment.

Subsequently, the second control device 54 calculates the attenuation amount of the first signal strength with respect to the reference signal strength for each captured satellite (step S72). The second control device 54 may use the reference signal strength stored in advance in the second storage device 55, or may receive the reference signal strength from the measurement device 10 via the second communication device 52.

The second control device 54 determines whether or not the average value of the attenuation amount of the first signal strength obtained for each captured satellite, that is, the average attenuation amount of the first signal strength, exceeds a predetermined value (step S73). As in the first embodiment, as an example, the predetermined value is −6 (dB). When the average attenuation amount of the first signal strength does not exceed the predetermined value (step S73: No), the second control device 54 returns to the processing of step S71. On the other hand, when the average attenuation amount of the first signal strength exceeds the predetermined value (step S73: Yes), the second control device 54 determines that the first height H1 is the water level (step S74).

Subsequently, the second control device 54 receives information including the second height H2 and the second signal strength obtained for each captured satellite from the measurement device 10 via the second communication device 52 (step S75). As described in the first embodiment, the second signal strength is the value of the SNR of each target radio signal received at the position of the second height H2. That is, in the sixth embodiment, the second communication device 52 receives information including the second height H2 different from the first height H1 and the second signal strength indicating the strength of the radio signal received at the position of the second height H2. Also, as described in the second embodiment, such information can also be received from the measurement device 10A of the second embodiment.

Subsequently, the second control device 54 calculates the attenuation amount of the second signal strength with respect to the reference signal strength for each captured satellite (step S76).

The second control device 54 determines whether or not the average value of the attenuation amount of the second signal strength obtained for each captured satellite, that is, the average attenuation amount of the second signal strength, exceeds the predetermined value (step S77). When the average attenuation amount of the second signal strength does not exceed the predetermined value (step S77: No), the second control device 54 returns to the processing of step S75. On the other hand, when the average attenuation amount of the second signal strength exceeds the predetermined value (step S77: Yes), the second control device 54 determines that the second height H2 is the water level (step S78).

Also, as can be understood from the description of the fifth water level determination processing, the program stored in the second storage device 55 of the management device 50 of the sixth embodiment causes the second control device 54 to receive the information including the first height H1 and the first signal strength indicating the strength of the radio signal related to the position information received at the position of the first height H1, and determine that the first height H1 is the water level when the attenuation amount of the first signal strength with respect to the reference signal strength exceeds the predetermined value. The second control device 54 is one form of a computer.

Effects of Sixth Embodiment

As described above, the management device 50 of the sixth embodiment includes the second communication device 52 that receives the information including the first height H1 and the first signal strength indicating the strength of the radio signal related to the position information received at the position of the first height H1, and the second control device 54 that determines that the first height H1 is the water level when the attenuation amount of the first signal strength with respect to the reference signal strength exceeds the predetermined value.

As the antenna depth from the water surface increases, the attenuation amount of the signal strength with respect to the reference signal strength increases. Based on the correlation between the antenna depth and the attenuation amount of the signal strength, for example, when the attenuation amount of the first signal strength of the radio signal received at the first height H1 exceeds the predetermined value, it can be inferred that the water surface has reached the position of the first height H1. That is, when the attenuation amount of the first signal strength acquired at the position of the first height H1 exceeds the predetermined value, it is possible to determine that the first height H1 is the water level.

Accordingly, according to the sixth embodiment, the water level of the river 100 can be measured with high accuracy as compared with the technique of JP-A-2014-119266 in which the water level is measured based on the height information with relatively low accuracy included in the GPS information.

Accordingly, according to the sixth embodiment, the water level of the river 100 can be measured with high accuracy as compared with the technique of JP-A-2014-119266 in which the water level is measured based on the height information with relatively low accuracy included in the GPS information.

In the management device 50 of the sixth embodiment, the second communication device 52 receives the information including the second height H2 different from the first height H1 and the second signal strength indicating the strength of the radio signal received at the position of the second height H2, and the second control device 54 determines that the second height H2 is the water level when the attenuation amount of the second signal strength with respect to the reference signal strength exceeds the predetermined value.

Thus, it is possible to detect that the water level of the river 100 has changed from the position of the first height H1 to the position of the second height H2.

The program stored in the second storage device 55 of the management device 50 of the sixth embodiment causes the second control device 54 to receive the information including the first height H1 and the first signal strength indicating the strength of the radio signal related to the position information received at the position of the first height H1, and determine that the first height H1 is the water level when the attenuation amount of the first signal strength with respect to the reference signal strength exceeds the predetermined value.

According to such a program, the water level of the river 100 can be measured with high accuracy as compared with the technique of JP-A-2014-119266 in which the water level is measured based on the height information with relatively low accuracy included in the GPS information.

Seventh Embodiment

A seventh embodiment will be described below.

In the seventh embodiment, a form will be described in which measurement of the height of the water level in the river width direction performed by the measurement device 10 of the third embodiment is performed by the management device 50. Also, for convenience of description, the seventh embodiment will be described using the measurement device 10 and the management device 50 of the third embodiment.

FIG. 19 is a flowchart showing sixth water level determination processing executed by the second control device 54 of the management device 50 according to the seventh embodiment. When the second control device 54 determines that the operation for starting the water level measurement is received based on the operation signal input from the input device 51, the second control device 54 reads and executes the program from the second storage device 55, thereby executing the sixth water level determination processing shown in FIG. 19.

As shown in FIG. 19, when starting the sixth water level determination processing, the second control device 54 first receives first information including the position information of the first position X1 and the third signal strength obtained for each captured satellite from the measurement device 10 via the second communication device 52 (step S81). As described in the third embodiment, the position information of the first position X1 is position information calculated based on each target radio signal received at the position of the first position X1. The third signal strength is the value of the SNR of each target radio signal received at the position of the first position X1. That is, in the seventh embodiment, the second communication device 52 receives the first information including the position information of the first position X1 and the third signal strength indicating the strength of the radio signal related to the position information received at the first position X1.

Subsequently, the second control device 54 receives second information including the position information of the second position X2 and the fourth signal strength obtained for each captured satellite from the measurement device 10 via the second communication device 52 (step S82). As described in the third embodiment, the position information of the second position X2 is position information calculated based on each target radio signal received at the position of the second position X2. Also, the fourth signal strength is the value of the SNR of each target radio signal received at the second position X2. That is, in the seventh embodiment, the second communication device 52 receives the second information including the position information of the second position X2 different from the first position X1 and the fourth signal strength indicating the strength of the radio signal received at the second position X2.

Subsequently, the second control device 54 calculates the attenuation amount of the third signal strength with respect to the reference signal strength and the attenuation amount of the fourth signal strength with respect to the reference signal strength for each captured satellite (step S83). Similarly to the sixth embodiment, the second control device 54 may use the reference signal strength stored in advance in the second storage device 55, or may receive the reference signal strength from the measurement device 10 via the second communication device 52.

Then, when the average value of the attenuation amount of the third signal strength with respect to the reference signal strength obtained for each captured satellite, that is, the average attenuation amount of the third signal strength, exceeds a predetermined value, and the average value of the attenuation amount of the fourth signal strength with respect to the reference signal strength obtained for each captured satellite, that is, the average attenuation amount of the fourth signal strength, is smaller than the predetermined value, the second control device 54 determines that the water level at the first position X1 is higher than the water level at the second position X2 (step S84). As in the first embodiment, the predetermined value is −6 (dB).

Effects of Seventh Embodiment

As described above, in the management device 50 of the seventh embodiment, the second communication device 52 receives the first information including the position information of the first position X1 and the third signal strength indicating the strength of the radio signal received at the first position X1, and the second information including the position information of the second position X2 different from the first position X1 and the fourth signal strength indicating the strength of the radio signal received at the second position X2, and the second control device 54 determines that the water level at the first position X1 is higher than the water level at the second position X2 when the attenuation amount of the third signal strength with respect to the reference signal strength exceeds the predetermined value and the attenuation amount of the fourth signal strength with respect to the reference signal strength is smaller than the predetermined value.

According to the seventh embodiment, it is possible to measure the height of the water level at a plurality of positions in the river 100. Also, as the position information indicating the position at which the water level is measured, position information obtained by a position measurement system using a satellite such as a GPS can be acquired.

Eighth Embodiment

An eighth embodiment will be described below.

In the eighth embodiment, a form in which measurement of the height of the water level in the river width direction performed by the measurement device 10 of the fourth embodiment is performed by the management device 50 will be described. Also, for convenience of description, the eighth embodiment will be described using the measurement device 10 and the management device 50 of the fourth embodiment.

FIG. 20 is a flowchart showing seventh water level determination processing executed by the second control device 54 of the management device 50 according to the eighth embodiment. When the second control device 54 determines that the operation for starting the water level measurement is received based on the operation signal input from the input device 51, the second control device 54 reads and executes the program from the second storage device 55, thereby executing the seventh water level determination processing shown in FIG. 20.

As shown in FIG. 20, when starting the seventh water level determination processing, the second control device 54 first receives the first information including the position information of the first position X1 and the third signal strength obtained for each captured satellite from the measurement device 10 via the second communication device 52 (step S91). Since the processing content of this step S91 is the same as the processing content of step S81 in the seventh embodiment, detailed description thereof will be omitted.

Subsequently, the second control device 54 receives the second information including the position information of the second position X2 and the fourth signal strength obtained for each captured satellite from the measurement device 10 via the second communication device 52 (step S92). Since the processing content of this step S92 is the same as the processing content of step S82 in the seventh embodiment, detailed description thereof will be omitted.

Then, when the third signal strength acquired at the first position X1 is smaller than the fourth signal strength acquired at the second position X2, the second control device 54 determines that the water level at the first position X1 is higher than the water level at the second position X2 (step S93).

Effects of Eighth Embodiment

As described above, in the management device 50 of the eighth embodiment, the second communication device 52 receives the first information including the position information of the first position X1 and the third signal strength indicating the strength of the radio signal received at the first position X1 and the second information including the position information of the second position X2 different from the first position X1 and the fourth signal strength indicating the strength of the radio signal received at the second position X2, and the second control device 54 determines that the water level at the first position X1 is higher than the water level at the second position X2 when the third signal strength is smaller than the fourth signal strength.

According to the eighth embodiment, it is possible to measure the height of the water level at a plurality of positions in the river 100. Also, as the position information indicating the position at which the water level is measured, position information obtained by a position measurement system using a satellite such as a GPS can be acquired.

Ninth Embodiment

A ninth embodiment will be described below.

In the ninth embodiment, a form will be described in which measurement of the position of the water area of the river 100 performed by the measurement device 10 of the fifth embodiment is performed by the management device 50. Also, for convenience of description, the ninth embodiment will be described using the measurement device 10 and the management device 50 of the fifth embodiment.

Figure 21:
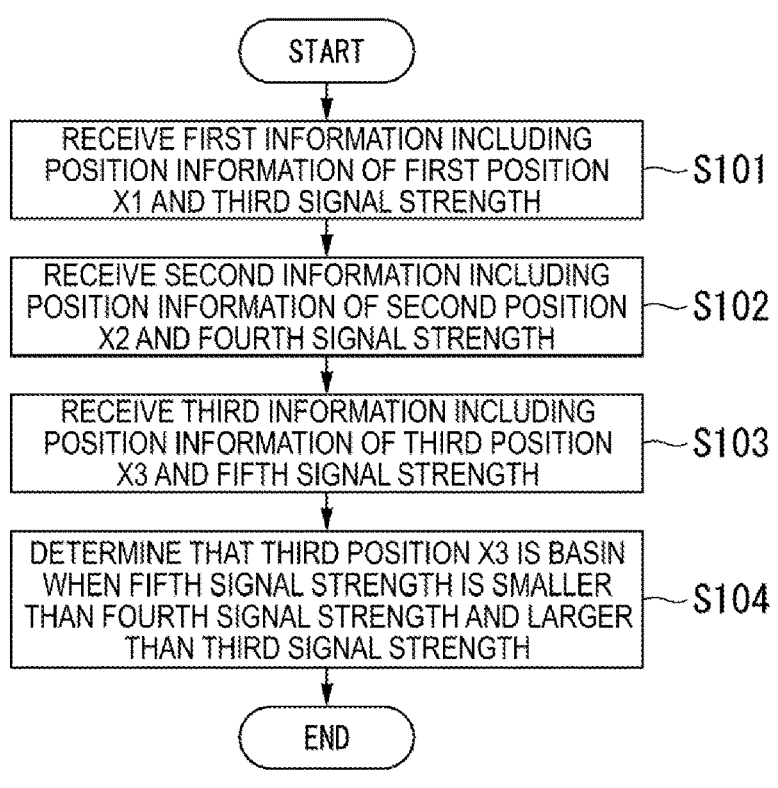
FIG. 21 is a flowchart showing second water area determination processing executed by a second control device of a management device according to a ninth embodiment.

FIG. 21 is a flowchart showing second water area determination processing executed by the second control device 54 of the management device 50 in the ninth embodiment. When the second control device 54 determines that an operation for starting water area measurement is received based on an operation signal input from the input device 51, the second control device 54 reads and executes the program from the second storage device 55, thereby executing the second water area determination processing shown in FIG. 21.

As shown in FIG. 21, when starting the second water area determination processing, the second control device 54 first receives the first information including the position information of the first position X1 and the third signal strength obtained for each captured satellite from the measurement device 10 via the second communication device 52 (step S101). Since the processing content of this step S101 is the same as the processing content of step S81 in the seventh embodiment, detailed description thereof will be omitted.

Subsequently, the second control device 54 receives the second information including the position information of the second position X2 and the fourth signal strength obtained for each captured satellite from the measurement device 10 via the second communication device 52 (step S102). Since the processing content of this step S102 is the same as the processing content of step S82 in the seventh embodiment, detailed description thereof will be omitted.

Subsequently, the second control device 54 receives third information including the position information of the third position X3 and the fifth signal strength obtained for each captured satellite from the measurement device 10 via the second communication device 52 (step S103). As described in the fifth embodiment, the position information of the third position X3 is position information calculated based on each target radio signal received at the position of the third position X3. In addition, the fifth signal strength is the value of the SNR of each target radio signal received at the position of the third position X3. That is, in the ninth embodiment, the second communication device 52 receives the third information including the position information of the third position X3 between the first position X1 and the second position X2 and the fifth signal strength indicating the strength of the radio signal received at the third position X3.

Then, when the fifth signal strength is smaller than the fourth signal strength and larger than the third signal strength, the second control device 54 determines that the third position X3 is the water area (basin) (step S104).

Effects of Ninth Embodiment

As described above, in the management device 50 of the ninth embodiment, the second communication device 52 receives the first information including the position information of the first position X1 and the third signal strength indicating the strength of the radio signal received at the first position X1, the second information including the position information of the second position X2 different from the first position X1 and the fourth signal strength indicating the strength of the radio signal received at the second position X2, and the third information including the position information of the third position X3 between the first position X1 and the second position X2 and the fifth signal strength indicating the strength of the radio signal received at the third position X3, and the second control device 54 determines that the third position X3 is the water area when the fifth signal strength is smaller than the fourth signal strength and larger than the third signal strength.

According to the ninth embodiment, the position of the water area of the river 100 can be measured. Also, as the position information indicating the position of the water area, position information obtained by a position measurement system using a satellite such as a GPS can be acquired.

Although the embodiments of the present disclosure have been described above, the technical scope of the present disclosure is not limited to the above-described embodiments, and various modifications can be made without departing from the gist of the present disclosure.

For example, although a form in which the antenna 21 is moved from the position of the first height H1 to the position of the second height H2 has been exemplified in the first embodiment, the antenna 21 may be moved to many other positions on the Z axis. In addition, in the second embodiment, a configuration in which a total of two antennas including the first antenna 25 and the second antenna 26 are switched by the switch 27 has been adopted, but the number of antennas is not limited to two. For example, a configuration may be adopted in which three or more antennas having different signal reception heights H are switched by a switch.

In the first embodiment, the first control device 14 may determine that the first height H1 is the water level when the acquisition device 11 cannot acquire the position information based on the radio signal received at the position of the first height H1. In addition, in the sixth embodiment, the second control device 54 may determine that the first height H1 is the water level when the second communication device 52 cannot receive the position information.

Figure 22:
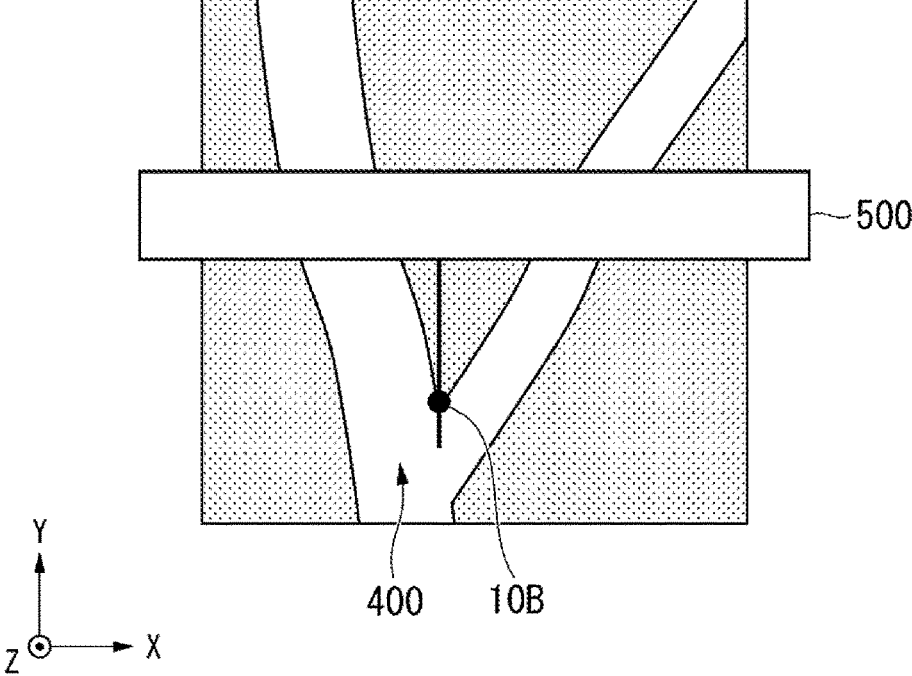
FIG. 22 is a first diagram showing an example of the measurement device moving along an Y axis.

In the first embodiment, a form in which the measurement device 10 moves along the X axis corresponding to the river width direction of the river 100 has been exemplified, but a measurement device that moves along the Y axis corresponding to a direction in which the river flows may be used. FIG. 22 is a first diagram showing an example of a measurement device 10B moving along the Y axis corresponding to a direction in which a river 400 flows. In the example shown in FIG. 22, a bridge 500 extending along the X axis is provided over a river 400 branching into two branches toward the upstream, and the measurement device 10B is attached to the bridge 500 to be movable along the Y axis. FIG. 22 shows a position of the measurement device 10B on the Y axis when a river width of the river 400 is a normal river width.

Figure 23:
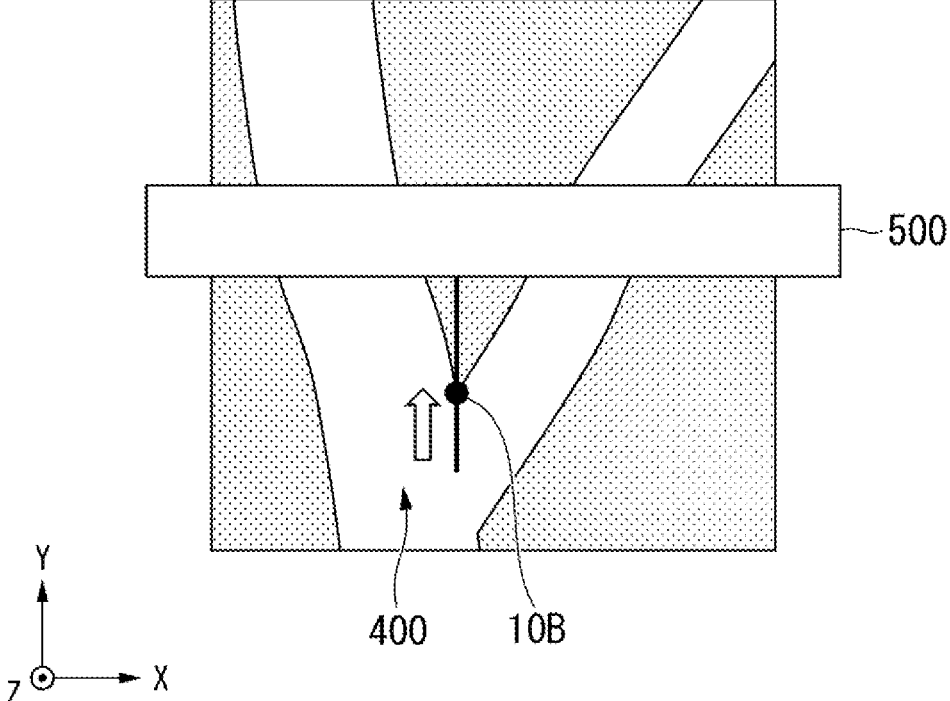
FIG. 23 is a second diagram showing an example of the measurement device moving along the Y axis.

FIG. 23 is a second diagram showing an example of the measurement device 10B moving along the Y axis corresponding to the direction in which the river 400 flows. FIG. 23 shows a position of the measurement device 10B on the Y axis when the river width of the river 400 increases due to rising water or the like. As can be seen by comparing FIGS. 22 and 23, when the river width of the river 400 increases, the measurement device 10B can be moved upstream along the Y axis to measure the water area of a site at which the river 400 branches into two branches.

SUMMARY OF PRESENT DISCLOSURE

A summary of present disclosure is appended below.

Appendix 1

An information processing device comprising: an acquisition device configured to acquire, as a first strength, a strength of a radio signal related to position information received at a position of a first height; and a first determination device configured to determine that the first height is a water level when an attenuation amount of the first strength with respect to a reference strength exceeds a predetermined value.

As the antenna depth from the water surface increases, the attenuation of the signal strength with respect to the reference signal strength increases. Based on such a correlation between the antenna depth and the attenuation amount of the signal strength, for example, when the attenuation amount of the first signal strength of the radio signal received at the first height exceeds a predetermined value, it can be inferred that the water surface has reached the position of the first height. That is, when the attenuation amount of the first signal strength acquired at the position of the first height exceeds the predetermined value, it is possible to determine that the first height is the water level.

Therefore, according to the information processing device described in Appendix 1, it is possible to measure the water level of a river or the like with high accuracy as compared with the technique of JP-A-2014-119266 in which the water level is measured based on height information with relatively low accuracy included in GPS information.

Appendix 2

The information processing device according to Appendix 1, wherein the first determination device determines that the first height is the water level when the acquisition device fails to acquire the position information based on the radio signal received at the position of the first height.

According to the information processing device described in Appendix 2, it is possible to measure the water level of a river or the like with high accuracy as compared with the technique of JP-A-2014-119266 in which the water level is measured based on height information with relatively low accuracy included in GPS information.

Appendix 3

The information processing device according to Appendix 1 or Appendix 2, wherein the acquisition device acquires, as a second strength, a strength of a radio signal received at a position of a second height different from the first height, and the first determination device determines that the second height is the water level when an attenuation amount of the second strength with respect to the reference strength exceeds the predetermined value.

Thus, it is possible to detect that the water level of the river or the like has changed from the position of the first height to the position of the second height.

Appendix 4

The information processing device according to Appendix 3, wherein the acquisition device includes: one antenna configured to receive the radio signal; a first moving device configured to move the antenna from the position of the first height to the position of the second height; and a receiving device configured to calculate a strength of the radio signal received by the antenna at the first height as the first strength and calculate a strength of the radio signal received by the antenna at the second height as the second strength. According to the information processing device described in Appendix 4, by configuring the acquisition device as described above, it is possible to continuously adjust the height at which the antenna is located, that is, the height of a position at which the radio signal is received.

Appendix 5

The information processing device according to Appendix 4, wherein the first moving device moves the antenna from the position of the first height to the position of the second height when the first determination device determines that the attenuation amount of the first strength exceeds the predetermined value while the antenna is disposed at the position of the first height.

Thus, when a water level of a river or the like rises due to rising water or the like, a change in the water level can be tracked.

Appendix 6

The information processing device according to Appendix 3, wherein the acquisition device includes: a first antenna configured to receive the radio signal at the position of the first height; a second antenna configured to receive the radio signal at the position of the second height; a receiving device configured to calculate a strength of the radio signal received by the first antenna at the position of the first height as the first strength and calculate a strength of the radio signal received by the second antenna at the position of the second height as the second strength; and a switch configured to switch an antenna electrically coupled to the receiving device between the first antenna and the second antenna.

According to the information processing device described in Appendix 6, by configuring the acquisition device as described above, it is possible to adjust the signal reception height H, which is the height of the position at which the radio signal is received, in a stepwise manner.

Appendix 7

The information processing device according to Appendix 6, wherein the switch switches the antenna electrically coupled to the receiving device from the first antenna to the second antenna when the first determination device determines that the attenuation amount of the first strength exceeds the predetermined value while the receiving device is electrically coupled to the first antenna.

Thus, when a water level of a river or the like rises due to rising water or the like, a change in the water level can be tracked.

Appendix 8

The information processing device according to any one of Appendixes 1 to 7, further comprising a second moving device configured to move the acquisition device to each of a first position and a second position different from the first position, wherein the acquisition device acquires position information of the first position based on a radio signal received at the first position and acquires position information of the second position based on a radio signal received at the second position.

According to the information processing device described in Appendix 8, it is possible to measure the water level at a plurality of positions in a river or the like. Also, as the position information indicating the position at which the water level is measured, position information obtained by a position measurement system using a satellite such as a GPS can be acquired.

Appendix 9

The information processing device according to Appendix 8, wherein the acquisition device acquires a strength of the radio signal received at the first position as a third strength, and acquires a strength of the radio signal received at the second position as a fourth strength, and the first determination device determines that the water level at the first position is higher than the water level at the second position when an attenuation amount of the third strength with respect to the reference strength exceeds the predetermined value and an attenuation amount of the fourth strength with respect to the reference strength is smaller than the predetermined value.

This makes it possible to measure the height of the water level at a plurality of positions in a river or the like.

Appendix 10

The information processing device according to appendix 8, wherein the acquisition device acquires a strength of the radio signal received at the first position as a third strength, and acquires a strength of the radio signal received at the second position as a fourth strength, and the first determination device determines that the water level at the first position is higher than the water level at the second position when the third strength is smaller than the fourth strength.

According to the information processing device described in Appendix 10, it is possible to measure the height of the water level at a plurality of positions in a river or the like. Also, as the position information indicating the position at which the water level is measured, position information obtained by a position measurement system using a satellite such as a GPS can be acquired.

Appendix 11

The information processing device according to Appendix 8, wherein the second moving device moves the acquisition device to a third position between the first position and the second position, the acquisition device acquires position information of the third position based on a radio signal received at the third position, the acquisition device acquires a strength of the radio signal received at the first position as a third strength, acquires a strength of the radio signal received at the second position as a fourth strength, and acquires a strength of the radio signal received at the third position as a fifth strength, and the first determination device determines that the third position is a water area when the fifth strength is smaller than the fourth strength and larger than the third strength.

According to the information processing device described in Appendix 11, it is possible to measure a position of a water area of a river or the like. Also, as the position information indicating the position of the water area, position information obtained by a position measurement system using a satellite such as a GPS can be acquired.

Appendix 12

An information processing device comprising: a communication device configured to receive information including a first height and a first strength indicating a strength of a radio signal related to position information received at a position of the first height; and a second determination device configured to determine that the first height is a water level when an attenuation amount of the first strength with respect to a reference strength exceeds a predetermined value.

As the antenna depth from the water surface increases, the attenuation of the signal strength with respect to the reference signal strength increases. Based on such a correlation between the antenna depth and the attenuation amount of the signal strength, for example, when the attenuation amount of the first signal strength of the radio signal received at the first height exceeds a predetermined value, it can be inferred that the water surface has reached the position of the first height. That is, when the attenuation amount of the first signal strength acquired at the position of the first height exceeds the predetermined value, it is possible to determine that the first height is the water level.

Therefore, according to the information processing device described in Appendix 12, it is possible to measure the water level of a river or the like with high accuracy as compared with the technique of JP-A-2014-119266 in which the water level is measured based on height information with relatively low accuracy included in GPS information.

Appendix 13

The information processing device according to Appendix 12, wherein the second determination device determines that the first height is the water level when the communication device fails to receive the position information.

According to the information processing device described in Appendix 13, it is possible to measure the water level of a river or the like with high accuracy as compared with the technique of JP-A-2014-119266 in which the water level is measured based on height information with relatively low accuracy included in GPS information.

Appendix 14

The information processing device according to Appendix 12 or 13, wherein the communication device receives information including a second height different from the first height and a second strength indicating a strength of a radio signal received at a position of the second height, and the second determination device determines that the second height is the water level when an attenuation amount of the second strength with respect to the reference strength exceeds the predetermined value.

According to the information processing device described in Appendix 14, it is possible to measure the height of the water level at a plurality of positions in a river or the like. Also, as the position information indicating the position at which the water level is measured, position information obtained by a position measurement system using a satellite such as a GPS can be acquired.

Appendix 15

The information processing device according to Appendix 12 or 13, wherein the communication device receives: first information including position information of a first position and a third strength indicating a strength of a radio signal received at the first position; and second information including position information of a second position different from the first position and a fourth strength indicating a strength of a radio signal received at the second position, and the second determination device determines that the water level at the first position is higher than the water level at the second position when an attenuation amount of the third strength with respect to the reference strength exceeds the predetermined value and an attenuation amount of the fourth strength with respect to the reference strength is smaller than the predetermined value.

According to the information processing device described in Appendix 15, it is possible to measure the height of the water level at a plurality of positions in a river or the like. Also, as the position information indicating the position at which the water level is measured, position information obtained by a position measurement system using a satellite such as a GPS can be acquired.

Appendix 16

The Information processing device according to Appendix 12 or Appendix 13, wherein the communication device receives: first information including position information of a first position and a third strength indicating a strength of a radio signal received at the first position; and second information including position information of a second position different from the first position and a fourth strength indicating a strength of a radio signal received at the second position, and the second determination device determines that the water level at the first position is higher than the water level at the second position when the third strength is smaller than the fourth strength.

According to the information processing device described in Appendix 16, it is possible to measure the height of the water level at a plurality of positions in a river or the like. Also, as the position information indicating the position at which the water level is measured, position information obtained by a position measurement system using a satellite such as a GPS can be acquired.

Appendix 17

The information processing device according to Appendix 12 or 13, wherein the communication device receives: first information including position information of a first position and a third strength indicating a strength of a radio signal received at the first position; second information including position information of a second position different from the first position and a fourth strength indicating a strength of a radio signal received at the second position; and third information including position information of a third position between the first position and the second position and a fifth strength indicating a strength of a radio signal received at the third position, and the second determination device determines that the third position is a water area when the fifth strength is smaller than the fourth strength and larger than the third strength.

According to the information processing device described in Appendix 17, it is possible to measure the position of the water area of the river 100. Also, as the position information indicating the position of the water area, position information obtained by a position measurement system using a satellite such as a GPS can be acquired.

Appendix 18

A non-transitory computer-readable storage medium storing a program, the program being configured to cause a computer to execute: acquiring, as a first strength, a strength of a radio signal related to position information received at a position of a first height; and determining that the first height is a water level when an attenuation amount of the first strength with respect to a reference strength exceeds a predetermined value.

According to the program described in Appendix 18, the water level of the river 100 can be measured with high accuracy as compared with the technique disclosed in JP-A-2014-119266 in which the water level is measured based on height information with relatively low accuracy included in GPS information.

Appendix 19

A non-transitory computer-readable storage medium storing a program, the program being configured to cause a computer to execute: receiving information including a first height and a first strength indicating a strength of a radio signal related to position information received at a position of the first height; and determining that the first height is a water level when an attenuation amount of the first strength with respect to a reference strength exceeds a predetermined value.

According to the program described in Appendix 19, the water level of the river 100 can be measured with high accuracy as compared with the technique disclosed in JP-A-2014-119266 in which the water level is measured based on height information with relatively low accuracy included in GPS information.

What is claimed is:

1. An information processing device comprising:
an acquisition device configured to acquire, as a first strength, a strength of a radio signal related to position information and received at a position of a first height; and
a first determination device configured to determine that the first height is a water level when an attenuation amount of the first strength with respect to a reference strength exceeds a predetermined value, wherein
the acquisition device acquires, as a second strength, a strength of the radio signal received at a position of a second height different from the first height,
the first determination device determines that the second height is the water level when an attenuation amount of the second strength with respect to the reference strength exceeds the predetermined value,
the acquisition device includes:
one antenna configured to receive the radio signal;
a first moving device configured to move the antenna from the position of the first height to the position of the second height; and
a receiving device configured to calculate a strength of the radio signal received by the antenna at the first height as the first strength and calculate a strength of the radio signal received by the antenna at the second height as the second strength, and
the first moving device moves the antenna from the position of the first height to the position of the second height when the first determination device determines that the attenuation amount of the first strength exceeds the predetermined value while the antenna is disposed at the position of the first height.

2. The information processing device according to claim 1, wherein
the first determination device determines that the first height is the water level when the acquisition device fails to acquire the position information based on the radio signal received at the position of the first height.

3. The information processing device according to claim 1, wherein the acquisition device includes:
a first antenna configured to receive the radio signal at the position of the first height;
a second antenna configured to receive the radio signal at the position of the second height;
a receiving device configured to calculate a strength of the radio signal received by the first antenna at the position of the first height as the first strength and calculate a strength of the radio signal received by the second antenna at the position of the second height as the second strength; and
a switch configured to switch the receiving device between being electrically coupled to the first antenna and being electrically coupled to the second antenna.

4. The information processing device according to claim 3, wherein the switch switches the receiving device from being electrically coupled to the first antenna to being electrically coupled to the second antenna when the first determination device determines that the attenuation amount of the first strength exceeds the predetermined value while the receiving device is electrically coupled to the first antenna.

5. The information processing device according to claim 1, further comprising a second moving device configured to move the acquisition device to each of a first position and a second position different from the first position, wherein the acquisition device acquires position information of the first position based on a radio signal received at the first position and acquires position information of the second position based on a radio signal received at the second position.

6. The information processing device according to claim 5, wherein the acquisition device acquires a strength of the radio signal received at the first position as a third strength, and acquires a strength of the radio signal received at the second position as a fourth strength, and the first determination device determines that the water level at the first position is higher than the water level at the second position when an attenuation amount of the third strength with respect to the reference strength exceeds the predetermined value and an attenuation amount of the fourth strength with respect to the reference strength is smaller than the predetermined value.

7. The information processing device according to claim 5, wherein the acquisition device acquires a strength of the radio signal received at the first position as a third strength, and acquires a strength of the radio signal received at the second position as a fourth strength, and the first determination device determines that the water level at the first position is higher than the water level at the second position when the third strength is smaller than the fourth strength.

8. The information processing device according to claim 5, wherein the second moving device moves the acquisition device to a third position between the first position and the second position, the acquisition device acquires position information of the third position based on a radio signal received at the third position, the acquisition device acquires a strength of the radio signal received at the first position as a third strength, acquires a strength of the radio signal received at the second position as a fourth strength, and acquires a strength of the radio signal received at the third position as a fifth strength, and the first determination device determines that the third position is a water level when the fifth strength is smaller than the fourth strength and larger than the third strength.

9. An information processing device comprising:

a communication device configured to receive information including a first height and a first strength indicating a strength of a radio signal related to position information and received at a position of the first height;

a second determination device configured to determine that the first height is a water level when an attenuation amount of the first strength with respect to a reference strength exceeds a predetermined value;

an acquisition device that acquires, as a second strength, a strength of the radio signal received at a position of a second height different from the first height; and an first determination device that determines that the second height is a water level when an attenuation amount of the second strength with respect to the reference strength exceeds the predetermined value, wherein the acquisition device includes:

one antenna configured to receive the radio signal;

a first moving device configured to move the antenna from the position of the first height to the position of the second height; and a receiving device configured to calculate a strength of the radio signal received by the antenna at the first height as the first strength and calculate a strength of the radio signal received by the antenna at the second height as the second strength, and the first moving device moves the antenna from the position of the first height to the position of the second height when the first determination device determines that the attenuation amount of the first strength exceeds the predetermined value while the antenna is disposed at the position of the first height.

10. The information processing device according to claim 9, wherein the second determination device determines that the first height is the water level when the communication device fails to receive the position information.

11. The information processing device according to claim 9, wherein the communication device receives information including a second height different from the first height and a second strength indicating a strength of a radio signal received at a position of the second height, and the second determination device determines that the second height is the water level when an attenuation amount of the second strength with respect to the reference strength exceeds the predetermined value.

12. The information processing device according to claim 9, wherein the communication device receives:

first information including position information of a first position and a third strength indicating a strength of a radio signal received at the first position; and second information including position information of a second position different from the first position and a fourth strength indicating a strength of a radio signal received at the second position, and the second determination device determines that the water level at the first position is higher than the water level at the second position when an attenuation amount of the third strength with respect to the reference strength exceeds the predetermined value and an attenuation amount of the fourth strength with respect to the reference strength is smaller than the predetermined value.

13. The information processing device according to claim 9, wherein the communication device receives:

first information including position information of a first position and a third strength indicating a strength of a radio signal received at the first position; and second information including position information of a second position different from the first position and a fourth strength indicating a strength of a radio signal received at the second position, and the second determination device determines that the water level at the first position is higher than the water level at the second position when the third strength is smaller than the fourth strength.

14. The information processing device according to claim 9, wherein the communication device receives:

first information including position information of a first position and a third strength indicating a strength of a radio signal received at the first position;

second information including position information of a second position different from the first position and a fourth strength indicating a strength of a radio signal received at the second position; and third information including position information of a third position between the first position and the second position and a fifth strength indicating a strength of a radio signal received at the third position, and the second determination device determines that the third position is a water level when the fifth strength is smaller than the fourth strength and larger than the third strength.

15. A non-transitory computer-readable storage medium storing a program, the program being configured to cause a computer to execute:

acquiring, by an acquisition device, as a first strength, a strength of a radio signal related to position information and received at a position of a first height; and determining, by a first determination device, that the first height is a water level when an attenuation amount of the first strength with respect to a reference strength exceeds a predetermined value, wherein the acquisition device acquires, as a second strength, a strength of the radio signal received at a position of a second height different from the first height, the first determination device determines that the second height is the water level when an attenuation amount of the second strength with respect to the reference strength exceeds the predetermined value, the acquisition device includes:

one antenna configured to receive the radio signal;

a first moving device configured to move the antenna from the position of the first height to the position of the second height; and a receiving device configured to calculate a strength of the radio signal received by the antenna at the first height as the first strength and calculate a strength of the radio signal received by the antenna at the second height as the second strength, and the first moving device moves the antenna from the position of the first height to the position of the second height when the first determination device determines that the attenuation amount of the first strength exceeds the predetermined value while the antenna is disposed at the position of the first height.

16. A non-transitory computer-readable storage medium storing a program, the program being configured to cause a computer to execute:

receiving, by an acquisition device, information including a first height and a first strength indicating a strength of a radio signal related to position information and received at a position of the first height; and determining, by a first determination device, that the first height is a water level when an attenuation amount of the first strength with respect to a reference strength exceeds a predetermined value, wherein the acquisition device acquires, as a second strength, a strength of the radio signal received at a position of a second height different from the first height, the first determination device determines that the second height is the water level when an attenuation amount of the second strength with respect to the reference strength exceeds the predetermined value, the acquisition device includes:

one antenna configured to receive the radio signal;

a first moving device configured to move the antenna from the position of the first height to the position of the second height; and a receiving device configured to calculate a strength of the radio signal received by the antenna at the first height as the first strength and calculate a strength of the radio signal received by the antenna at the second height as the second strength, and the first moving device moves the antenna from the position of the first height to the position of the second height when the first determination device determines that the attenuation amount of the first strength exceeds the predetermined value while the antenna is disposed at the position of the first height.

* * * * *